United States Patent
He et al.

(10) Patent No.: US 11,323,394 B2
(45) Date of Patent: May 3, 2022

(54) BUFFER CONTROL METHOD, NETWORK ELEMENT, AND CONTROLLER

(71) Applicant: HUAWEI TECHNOLOGIES CO., LTD., Shenzhen (CN)

(72) Inventors: Gangjie He, Shanghai (CN); Longyu Cao, Shanghai (CN); Yijun Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/711,756

(22) Filed: Dec. 12, 2019

(65) Prior Publication Data
US 2020/0120046 A1  Apr. 16, 2020

Related U.S. Application Data

(63) Continuation of application No. PCT/CN2018/090581, filed on Jun. 11, 2018.

(30) Foreign Application Priority Data

Jun. 16, 2017 (CN) .......................... 201710456925.0

(51) Int. Cl.
*H04L 12/861* (2013.01)
*H04L 12/801* (2013.01)
(Continued)

(52) U.S. Cl.
CPC .......... *H04L 49/9005* (2013.01); *H04L 45/38* (2013.01); *H04L 45/64* (2013.01);
(Continued)

(58) Field of Classification Search
None
See application file for complete search history.

(56) References Cited

U.S. PATENT DOCUMENTS

2003/0198241 A1* 10/2003 Putcha ................ H04L 49/3081
370/419
2014/0341199 A1  11/2014 Jeon et al.
(Continued)

FOREIGN PATENT DOCUMENTS

CN  104348750 A  2/2015
CN  104735734 A  6/2015
(Continued)

OTHER PUBLICATIONS

Jianbiao Mao et al., "PiBuffer: A Model of OpenFlow Flow Buffer Management in Datacenter Network", Chinese Journal of Computer, vol. 39, No. 6, Jun. 2016, 13 pages including English-language abstract.
(Continued)

*Primary Examiner* — Scott M Sciacca
(74) *Attorney, Agent, or Firm* — Maier & Maier, PLLC

(57) ABSTRACT

A buffer control method, a network element, and a system. The method includes: receiving, by a network element, a flow table message from a controller, where the flow table message includes buffer information of a data packet matching a flow table; processing, by the network element, a buffer of the data packet based on the buffer information, and sending a flow table response message to the controller. In the method, the network element can save, based on a corresponding saving manner, at least one data packet matching the flow table to the buffer corresponding to the flow table. Thus a data flow granularity-based buffer processing manner can be supported in an OpenFlow protocol, and a data buffering requirement of a mobile network can be met.

17 Claims, 15 Drawing Sheets

(51) Int. Cl.
*H04L 49/9005* (2022.01)
*H04L 45/00* (2022.01)
*H04L 45/64* (2022.01)
*H04L 49/9047* (2022.01)
*H04W 28/12* (2009.01)
*H04W 28/14* (2009.01)
*H04W 36/00* (2009.01)
*H04W 36/02* (2009.01)

(52) U.S. Cl.
CPC ......... *H04L 49/9052* (2013.01); *H04W 28/12* (2013.01); *H04W 28/14* (2013.01); *H04W 36/0033* (2013.01); *H04W 36/02* (2013.01)

(56) References Cited

U.S. PATENT DOCUMENTS

| | | | | |
|---|---|---|---|---|
| 2016/0191406 | A1* | 6/2016 | Xiao | H04L 45/38 370/235 |
| 2016/0337250 | A1* | 11/2016 | Ni | H04L 63/0245 |
| 2017/0272367 | A1* | 9/2017 | Kozat | H04L 47/24 |
| 2019/0190856 | A1* | 6/2019 | Fiaschi | H04L 49/9005 |
| 2020/0351211 | A1* | 11/2020 | Kunz | H04L 45/566 |

FOREIGN PATENT DOCUMENTS

| | | | |
|---|---|---|---|
| CN | 104821923 A | 8/2015 | |
| EP | 3 043 597 A1 | 7/2016 | |
| EP | 3 048 764 A1 | 7/2016 | |

OTHER PUBLICATIONS

Jianfeng Zou, "Software-Defined Networking Technology Research Based on Openflow", master"s dissertation, Beijing University of Posts and Telecommunications, Dec. 1, 2013, with an English abstract, 64 pages including English-language abstract.

Tolga Bagci et al. "Queue-allocation optimization for adaptive video streaming over software defined networks with multiple service-levels." 2016 IEEE ICIP. Sep. 25, 2016. pp. 1519-1523. XP033016774.

Palma et al. "The QueuePusher: Enabling Queue Management in OpenFlow." 2014 Third European Workshop on Software-Defined Networks, IEEE. Sep. 1, 2014. pp. 125-126. XP032703424.

* cited by examiner

BUFFER CONTROL METHOD, NETWORK ELEMENT, AND CONTROLLER

CROSS-REFERENCE TO RELATED DISCLOSURE

This application is a continuation of International Application No. PCT/CN2018/090581, filed on Jun. 11, 2018, which claims priority to Chinese Patent Application No. 201710456925.0, filed on Jun. 16, 2017. The disclosure of the aforementioned disclosures are hereby incorporated by reference in its entirety.

TECHNICAL FIELD

This application relates to network technologies, and in particular, to a buffer control method, a network element, and a controller.

BACKGROUND

With development of network technologies, the separation of control and forwarding is a developing trend of mobile networks, and a 5th generation (5G) network architecture that is newly defined by the 3rd generation partnership project (3GPP) standards organization is also based on the separation of control and forwarding.

A popular network technology that implements the separation of control and forwarding is a software-defined network (SDN) architecture. The SDN architecture includes: a control plane network element and a forwarding plane network element (or a user plane network element) in a mobile network. Both the control plane network element and the forwarding plane network element in the mobile network can communicate with a controller in the mobile network (where the forwarding plane network element in the mobile network can communicate with the controller by using an OpenFlow protocol). In some scenarios, the forwarding plane network element in the mobile network requires a buffering capability to ensure normal forwarding of a data packet in the mobile network. However, a dedicated buffer processing mechanism is not provided in an existing OpenFlow protocol.

SUMMARY

Embodiments provide a buffer control method, a network element, and a controller to implement a flow granularity-based buffer processing mechanism in an OpenFlow protocol to meet a data buffering requirement of a mobile network.

According to a first aspect, an embodiment provides a buffer control method, including:

receiving, by a network element, a flow table message from a controller, where the flow table message includes buffer information of a data packet matching a flow table;

processing, by the network element, a buffer of the data packet based on the buffer information; and sending, by the network element, a flow table response message to the controller.

In the buffer control method provided in the first aspect, the network element receives the flow table message from the controller, where the flow table message includes the buffer information of the data packet matching the flow table; and, further, the network element processes the buffer of the data packet based on the buffer information, so that the network element can save, based on a corresponding saving manner, at least one data packet matching the flow table to the buffer corresponding to the flow table. It can be understood that, according to the buffer control method provided in this embodiment, a data flow granularity-based buffer processing manner can be supported in an OpenFlow protocol, and a data buffering requirement of a mobile network can be met.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

According to a second aspect, an embodiment provides a buffer control method, including:

sending, by a controller, a flow table message to a network element, where the flow table message includes buffer information of a data packet matching a flow table; and receiving, by the controller, a flow table response message from the network element.

In the buffer control method provided in the second aspect, the controller sends the flow table message to the network element (where the flow table message includes the buffer information of the data packet matching the flow table), and the network element processes the buffer of the data packet based on the buffer information in the received flow table message, so that the network element can save, based on a corresponding saving manner, at least one data packet matching the flow table to the buffer corresponding to the flow table. It can be understood that, according to the buffer control method provided in this embodiment, a data flow granularity-based buffer processing manner can be supported in an OpenFlow protocol, and a data buffering requirement of a mobile network can be met.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

According to a third aspect, an embodiment provides a network element, including:

a receiving module, configured to receive a flow table message from a controller, where the flow table message includes buffer information of a data packet matching a flow table;

a processing module, configured to process a buffer of the data packet based on the buffer information; and a sending module, configured to send a flow table response message to the controller.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

For beneficial effects of the network element provided in the implementations of the third aspect, the beneficial effect brought by the possible implementations of the first aspect may be referred to, and details are not described herein again.

According to a fourth aspect, an embodiment provides a controller, including:

a sending module, configured to send a flow table message to a network element, where the flow table message includes buffer information of a data packet matching a flow table; and a receiving module, configured to receive a flow table response message from the network element.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

For beneficial effects of the controller provided in the implementations of the fourth aspect, the beneficial effects brought by the possible implementations of the second aspect may be referred to, and details are not described herein again.

According to a fifth aspect, an embodiment provides a network element, including a memory, a processor, and a transceiver, where the memory is configured to store a program instruction;

the transceiver is configured to receive a flow table message from a controller, where the flow table message includes buffer information of a data packet matching a flow table;

the processor is configured to invoke the program instruction in the memory to perform the following step: processing a buffer of the data packet based on the buffer information; and the transceiver is further configured to send a flow table response message to the controller.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

For beneficial effects of the network element provided in the implementations of the fifth aspect, the beneficial effects brought by the possible implementations of the first aspect may be referred to, and details are not described herein again.

According to a sixth aspect, an embodiment provides a computer storage medium. The computer storage medium stores an instruction. When the instruction is run on a computer, the computer is enabled to perform any method according to the first aspect.

According to a seventh aspect, an embodiment provides a controller, including a memory, a processor, and a transceiver, where the memory is configured to store a program instruction; the processor is configured to invoke the program instruction in the memory;

the transceiver is configured to send a flow table message to a network element, where the flow table message includes buffer information of a data packet matching a flow table; and the transceiver is further configured to receive a flow table response message from the network element.

In a possible implementation, the buffer information includes buffer creation instruction information, buffer modification instruction information, or buffer deletion instruction information.

In a possible implementation, the buffer information includes buffer type information, and the buffer type information is used to indicate a saving manner of the data packet.

In a possible implementation, the buffer type information includes: saving a received data packet, or saving and forwarding a received data packet.

In a possible implementation, the buffer information includes a buffer creation trigger indication, and the buffer creation trigger indication is used to indicate a creation occasion of the buffer.

In a possible implementation, the buffer creation trigger indication includes: an indication of creating the buffer when the network element receives the flow table message, or an indication of creating the buffer when a receiving rate of the network element is greater than a forwarding rate of the network element.

In a possible implementation, the buffer information includes a size of a storage space of the buffer.

In a possible implementation, the buffer information is located in an action set field of the flow table message.

For beneficial effects of the controller provided in the implementations of the seventh aspect, the beneficial effects brought by the possible implementations of the second aspect may be referred to, and details are not described herein again.

According to an eighth aspect, an embodiment provides a computer storage medium. The computer storage medium stores an instruction. When the instruction is run on a computer, the computer is enabled to perform any method according to the second aspect.

DETAILED DESCRIPTION OF EMBODIMENTS

First, some terms and scenarios in the embodiments are explained and described.

A radio access network control plane (RAN-C) in the embodiments includes a control plane function of a conventional access network.

A gateway control plane (GW-C) in the embodiments includes a control plane function of a conventional gateway device.

A controller in a mobile network in the embodiments can be responsible for managing lower-layer forwarding plane resources and serving an upper-layer control plane network element (for example, the RAN-C and the GW-C). Optionally, the controller may also be referred to as an SDN controller. This is not limited in the embodiments.

A radio access network user plane (RAN-U) in the embodiments includes a user plane function of the conventional access network, and performs communication by using an OpenFlow protocol.

A gateway user plane (GW-U) in the embodiments includes a user plane function of a conventional gateway, and performs communication by using the OpenFlow protocol.

A mobility management entity (MME) in the embodiments is a key control node in a 3GPP protocol long term evolution (LTE) access network. Functions of the MME include admission control, mobility management, session management, network element selection, user equipment (UE) bearer information storage, and the like.

In the embodiments, one or more data packets having same header information are defined to belong to a same data flow.

A flow table message in the embodiments may be sent/received by using the OpenFlow protocol.

Figure 1:
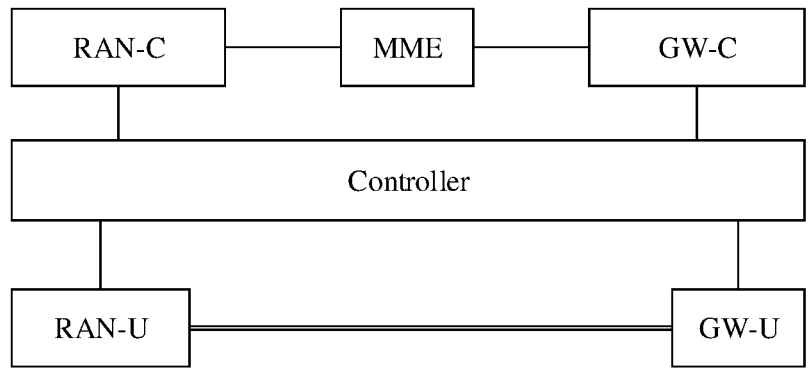
FIG. 1 is a schematic structural diagram of a software-defined network according to an embodiment.

FIG. 1 is a schematic structural diagram of a software-defined network according to an embodiment. As shown in FIG. 1, a control plane network element and a forwarding plane network element (or a user plane network element) in a mobile network is separated based on an SDN architecture. The control plane network element in the mobile network communicates with a controller in the mobile network through a northbound interface. The control plane network element includes: RAN-C and a GW-C. The forwarding plane network element in the mobile network communicates with the controller in the mobile network by using an OpenFlow protocol. The forwarding plane network element includes: a RAN-U and a GW-U.

The buffer control method, the network element, and the controller provided may be applicable to the network structure shown in FIG. 1, or may be applicable to another equivalent or transformed network structure shown in FIG. 1. This is not limited in this embodiment.

In the network structure shown in FIG. 1, generally, the RAN-U and/or the GW-U has a specific buffering capability in the following several cases to ensure normal forwarding of a data packet in the mobile network.

Case 1: When a terminal device is in an idle mode (for example, an air interface connection and an S1 connection have been released) and the GW-U receives downlink data to be sent to the terminal device, the GW-U cannot continue to forward the downlink data. Therefore, the GW-U needs to buffer the downlink data flow to wait for establishment of the air interface connection and the S1 connection.

Case 2: When an air interface connection of the terminal device has been released and the RAN-U receives downlink data to be sent to the terminal device, the RAN-U cannot continue to forward the downlink data. Therefore, the RAN-U needs to buffer the downlink data to wait for establishment of the air interface connection.

Case 3: When the terminal device is in a connected mode, and the RAN-U receives a large amount of downlink data and forwards the downlink data to the terminal device through an air interface connection, due to insufficient air interface resources, a rate at which the RAN-U forwards the downlink data to the terminal device may not match a rate at which the RAN-U receives the downlink data. Therefore, the RAN-U needs to buffer the received downlink data flow.

Case 4: When the terminal device performs network handover, the target RAN-U needs to receive downlink data from a source RAN-U and downlink data from the GW-U. To ensure that the downlink data from the source RAN-U is preferentially forwarded, the RAN-U needs to buffer the downlink data from the GW-U.

The RAN-U and/or the GW-U may also utilize a specific buffering capability in another case. This is not limited in this embodiment.

Because an existing OpenFlow protocol does not provide a dedicated buffer processing mechanism, considering that a data volume in the mobile network is very large, the issue of how to implement the dedicated buffer processing mechanism in the OpenFlow protocol is an urgent technical problem to be resolved.

Therefore, according to the buffer control method, the network element, and the controller provided in this embodiment, the flow granularity-based buffer processing mechanism is implemented in the OpenFlow protocol, and a data buffering requirement of the mobile network is met.

The following describes in detail, using various embodiments, technical solutions and how to resolve the foregoing technical problem by using the technical solutions. The following several embodiments may be combined with one another. Same or similar concepts or processes may not be described in detail in some embodiments.

Figure 2:
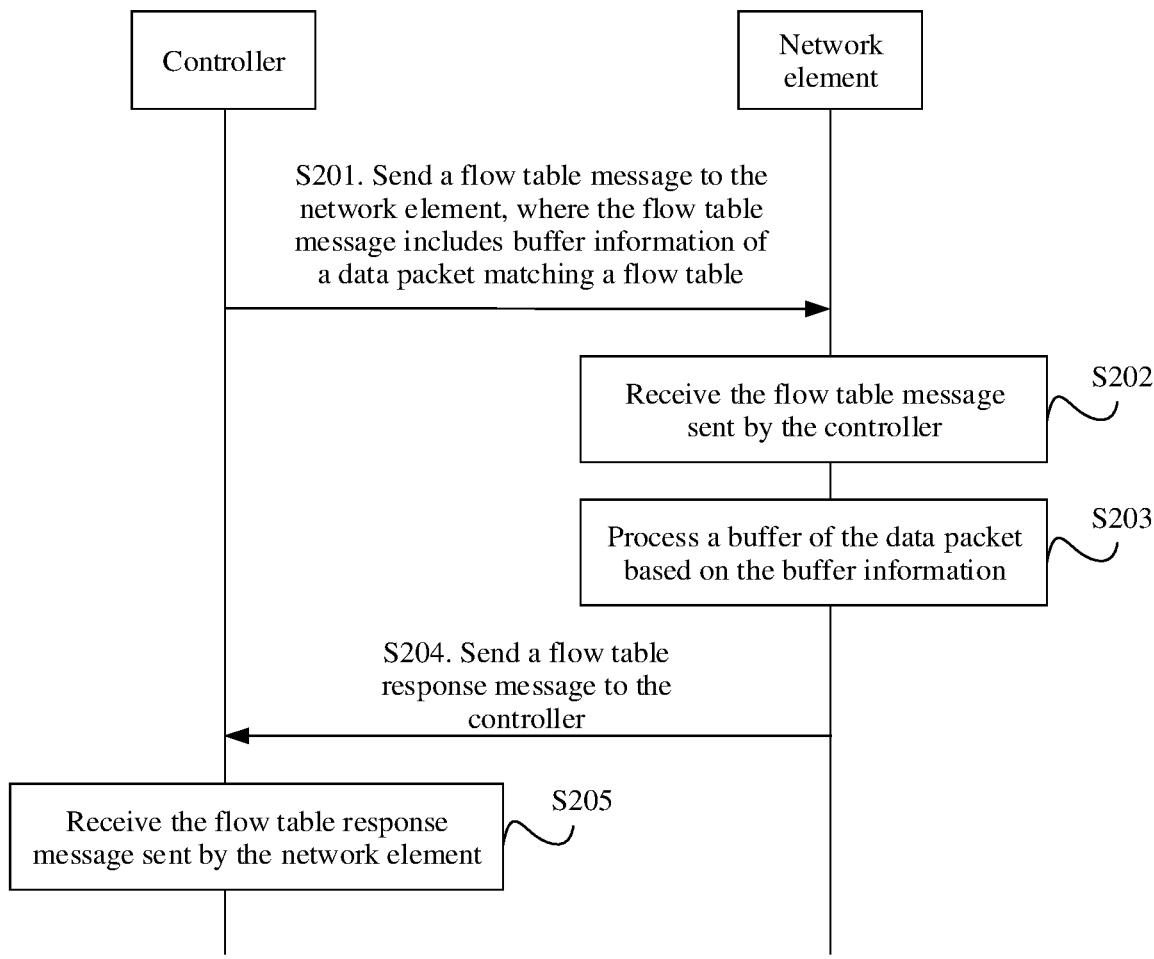
FIG. 2 is a schematic flowchart of a first embodiment of a buffer control method.

FIG. 2 is a schematic flowchart of a first embodiment of a buffer control method. An execution body in this embodiment includes a controller and/or a network element. Both the controller and the network element may be implemented by using software and/or hardware. Optionally, the network element in this embodiment may include, but is not limited to: a GW-U or a RAN-U. As shown in FIG. 2, the method of this embodiment includes the following steps.

In Step S201, the controller sends a flow table message to the network element, where the flow table message includes buffer information of a data packet matching a flow table.

In this step, the controller sends the flow table message to the network element. Optionally, the flow table message is used to indicate information about the flow table. Optionally, the flow table message includes the buffer information of the data packet matching the flow table. Optionally, if the flow table can match one or more data packets, the one or more data packets are bound to have same header information, that is, the one or more data packets belong to a same data flow, that is, the same data flow corresponds to a same buffer (for example, the buffer is configured to store the one or more data packets matching the flow table, and the plurality of data packets belong to the same data flow).

Optionally, the buffer information includes buffer creation instruction information, buffer modification instruction information, or buffer deletion instruction information. The buffer creation instruction information is used to instruct the network element to create the buffer (configured to store the at least one data packet matching the flow table) corresponding to the flow table. The buffer modification instruction information is used to instruct the network element to modify attribute information of the buffer corresponding to the flow table (for example, including, but not limited to, buffer type information of the buffer or a size of a storage space of the buffer). The buffer deletion instruction information is used to instruct the network element to delete the buffer corresponding to the flow table.

Optionally, the buffer information may further include any one or more of the following: buffer type information, a buffer creation trigger indication, and a size of a storage space of a buffer. The buffer information may further include other information, as desired. This is not limited in this embodiment.

For ease of understanding, the following part in this embodiment explains and describes cases in which the buffer information includes any of the buffer type information, the buffer creation trigger indication, and the size of the storage space of the buffer.

(A) Optionally, the buffer information may include the buffer type information, and the buffer type information is used to indicate a saving manner of the data packet (that is, a saving manner of saving the data packet matching the flow table to the buffer). Optionally, the buffer type information includes, but is not limited to: saving (for example, only saving instead of forwarding) a received data packet, or saving and forwarding (for example, forwarding while saving) a received data packet.

Optionally, the buffer type information may be indicated by using a preset value of a first preset field, for example, if the first preset field has a first preset value, it indicates that the buffer type information includes saving the received data packet matching the flow table; or if the first preset field has a second preset value, it indicates that the buffer type information includes saving and forwarding the received data packet matching the flow table. Further, the buffer type information may alternatively be indicated in another manner. This is not limited in this embodiment.

(B) Optionally, the buffer information may include a buffer creation trigger indication, and the buffer creation trigger indication is used to indicate a creation occasion of the buffer. Optionally, the buffer creation trigger indication includes, but is not limited to: an indication of creating the buffer when the network element receives the flow table message (that is, the network element immediately creates the buffer when receiving the flow table message), or an indication of creating the buffer when a receiving rate of the network element is greater than a forwarding rate of the network element. Optionally, the receiving rate of the network element represents a rate at which the network element receives the at least one data packet matching the flow table, and the forwarding rate is a rate at which the network element forwards the at least one data packet.

Optionally, the buffer creation trigger indication may be indicated by using a preset value of a second preset field, for example, if the second preset field has a third preset value, it indicates that the buffer creation trigger indication includes the indication of creating the buffer when the network element receives the flow table message; or if the second preset field has a fourth preset value, it indicates that the buffer creation trigger indication includes the indication of creating the buffer when the receiving rate of the network element is greater than the forwarding rate of the network element. Further, the buffer creation trigger indication may alternatively be indicated in another manner. This is not limited in this embodiment.

(C) Optionally, the buffer information may alternatively include the size of the storage space of the buffer. Optionally, the size of the storage space of the buffer may be indicated by using a preset value of a third preset field. Alternatively, the size of the storage space of the buffer may be indicated in another manner. This is not limited in this embodiment.

Optionally, when the buffer information includes at least two of the buffer type information, the buffer creation trigger indication, and the size of the storage space of the buffer, a combination of corresponding indication manners recorded in the foregoing parts (A) to (C) may be used. This is not limited in this embodiment.

Optionally, if the buffer information includes the buffer creation instruction information, the buffer information may alternatively not include any one or more of the buffer type information, the buffer creation trigger indication, and the size of the storage space of the buffer, the network element determines, based on the buffer information, that the buffer corresponding to the flow table is created based on any one or more of preset buffer type information, a preset create trigger indication, and a preset storage space size. For example, if the buffer information includes the buffer creation instruction information and the buffer type information, the network element determines, based on the buffer information, that the buffer corresponding to the flow table is created based on the buffer type information, a preset create trigger indication, and a preset storage space size. In another example, if the buffer information includes the buffer creation instruction information, the buffer type information, and the buffer creation trigger indication, the network element determines, based on the buffer information, that the buffer corresponding to the flow table is created based on the buffer type information, the buffer creation trigger indication, and a preset storage space size.

Optionally, in this embodiment, the buffer information may be located in an action set field of the flow table message. For example, the buffer information may alternatively be located in another field of the flow table message. This is not limited in this embodiment.

Table 1 shows an added field type of the action set field in this embodiment. As shown in Table 1, the following describes an example in which the buffer information is located in the action set field of the flow table message.

Table 1 shows an added field type of the action set field in this embodiment.

| Field type | Parameter | Parameter description |
| --- | --- | --- |
| Buffer creation instruction information | Size of a storage space of a buffer | Optional parameter; used to indicate the storage space of the buffer (if the size of the storage space of the buffer is not carried, a preset size of the storage space of the buffer is used by default) |
| | Buffer type information | Optional parameter; used to indicate a saving manner of a data packet matching a flow table; and including the following two values (if the buffer type information is not carried, a default value is the second preset value):<br>(1) The first preset field has the first preset value, indicating to save a received data packet; and<br>(2) The first preset field has the second preset value, indicating to save and forward a received data packet. |
| | Buffer creation trigger indication | Optional parameter; used to indicate a creation occasion of the buffer; and including the following two values (if the buffer creation trigger indication is not carried, a default value is the third preset value):<br>(1) The second preset field has the third preset value, indicating an indication of creating the buffer when the network element receives the flow table message.<br>(2) The second preset field has the fourth preset value, indicating an indication of creating the buffer when a receiving rate of the network element is greater than a forwarding rate of the network element. |

-continued

| Field type | Parameter | Parameter description |
|---|---|---|
| Buffer modification instruction information | Size of a storage space of a buffer | Optional parameter; used to indicate a modified size of a storage space of the buffer (if the size of the storage space of the buffer is not carried, it indicates not to modify the size of the storage space of the buffer) |
| | Buffer type information | Optional parameter; used to indicate modified buffer type information (if the buffer type information is not carried, it indicates not to modify the buffer type information of the buffer) |
| Delete buffer instruction information | | Used to instruct to delete a buffer |

Optionally, the flow table message may further include: an identifier of the flow table and/or matching information of the flow table. The matching information of the flow table is used to indicate characteristic information of the data packet matching the flow table (for example, including, but not limited to, a source IP address, a source port number, a destination IP address, a destination port number, a protocol type, and the like of the data packet). Optionally, the matching information may be located in a matching field of the flow table message. For example, the matching information may alternatively be located in another field of the flow table message. This is not limited in this embodiment.

Additionally, the flow table message may further include other information. This is not limited in this embodiment.

In Step S202, the network element receives the flow table message from the controller.

In this step, the network element receives the flow table message from the controller. Optionally, the flow table message includes the buffer information of the data packet matching the flow table.

In Step S203, the network element processes the buffer of the data packet based on the buffer information.

In this step, the network element performs, based on the buffer information (including, but not limited to: the buffer creation instruction information, the buffer modification instruction information, and the buffer deletion instruction information), corresponding processing on the buffer (used to store one or more data packets matching the flow table, and the plurality of data packets belong to a same data flow) corresponding to the flow table, where the processing includes, but is not limited to: creating the buffer, modifying the buffer, and deleting the buffer.

For example, if the buffer information includes buffer creation instruction information and a size of a storage space of the buffer, the network element creates, based on the buffer creation instruction information and the size of the storage space of the buffer, a buffer that meets the size of the storage space. In addition, buffer type information of the buffer is preset buffer type information, and the buffer creation trigger indication is a preset creation trigger indication, so that the network element saves, based on a corresponding saving manner, at least one data packet matching the flow table to the buffer corresponding to the flow table.

In another example, if the buffer information includes buffer modification instruction information and modified buffer type information, the network element modifies, based on the buffer modification instruction information and the modified buffer type information, original buffer type information of the buffer corresponding to the flow table to the modified buffer type information, so that the network element saves, based on a corresponding saving manner, at least one data packet matching the flow table to the buffer corresponding to the flow table.

In another example, if the buffer information includes buffer deletion instruction information, the network element deletes, based on the buffer deletion instruction information, the buffer corresponding to the flow table.

Additionally, the buffer information may further include other types of information. Correspondingly, the network element processes, based on the buffer information, the buffer corresponding to the flow table. This is not limited in this embodiment.

In Step S204, the network element sends a flow table response message to the controller.

In this embodiment, after processing the buffer of the data packet based on the buffer information, the network element sends the flow table response message to the controller, to notify the controller of a result of the processing performed by the network element based on the flow table message. Optionally, if the network element successfully completes processing on the data packet, the flow table response message carries acknowledgment information; or if the network element fails to successfully complete processing on the data packet, the flow table response message carries non-acknowledgment information.

In Step S205, the controller receives the flow table response message from the network element.

In this embodiment, the controller sends a flow table message to the network element, where the flow table message includes buffer information of a data packet matching a flow table; and further, the network element processes a buffer of the data packet based on the buffer information in the received flow table message, so that the network element can save, based on a corresponding saving manner, at least one data packet matching the flow table to the buffer corresponding to the flow table. That is, the network element can save a plurality of data packets belonging to a same data flow to a same buffer. It can be understood that, according to the buffer control method provided in this embodiment, a data flow granularity-based buffer processing manner can be supported in an OpenFlow protocol, and a data buffering requirement of a mobile network can be met.

Figure 3:
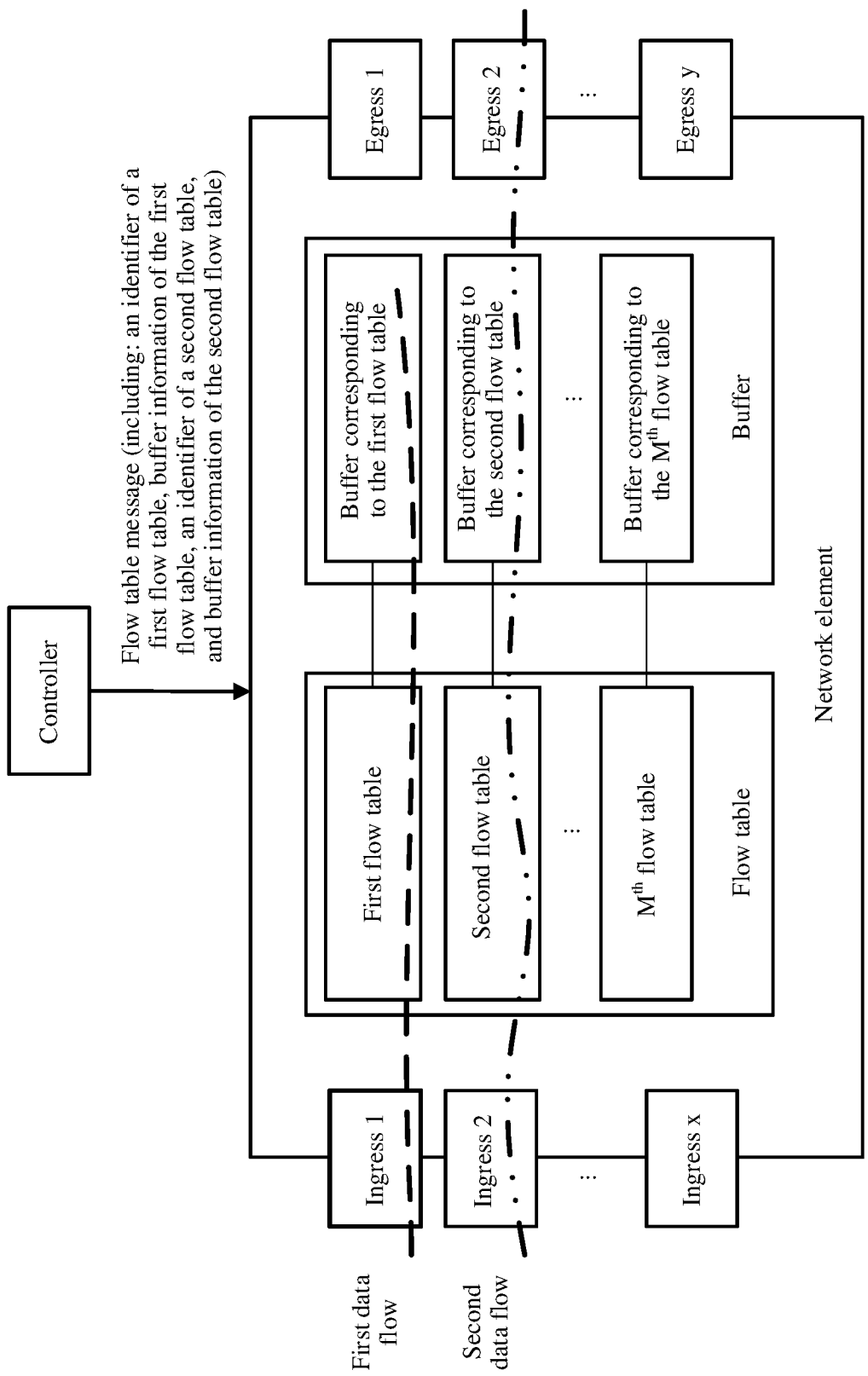
FIG. 3 is a schematic flowchart of a second embodiment of a buffer control method.

FIG. 3 is a schematic flowchart of a second embodiment of a buffer control method. As shown in FIG. 3, it is assumed that a flow table message from the controller to the network element includes: an identifier of a first flow table, buffer information of the first flow table, an identifier of a second flow table, and buffer information of the second flow table. The buffer information of the first flow table includes: buffer creation instruction information of the first flow table and buffer type information of the first flow table (for example, saving a received first data packet matching the first flow table). The buffer information of the second flow table includes: buffer creation instruction information of the second flow table and buffer type information of the second flow table (for example, saving and forwarding a received second data packet matching the second flow table).

When the network element receives, from an ingress 1, one or more first data packets (for example, a first data flow) matching the first flow table, the network element saves, based on the buffer information of the first flow table, the one or more first data packets to a buffer corresponding to the first flow table. When the network element receives, from an ingress 2, one or more second data packets (for example, a second data flow) matching the second flow table, the network element saves the one or more second data packets based on the buffer information of the second flow table and forwards the one or more second data packets from an egress 2.

Figure 4A:
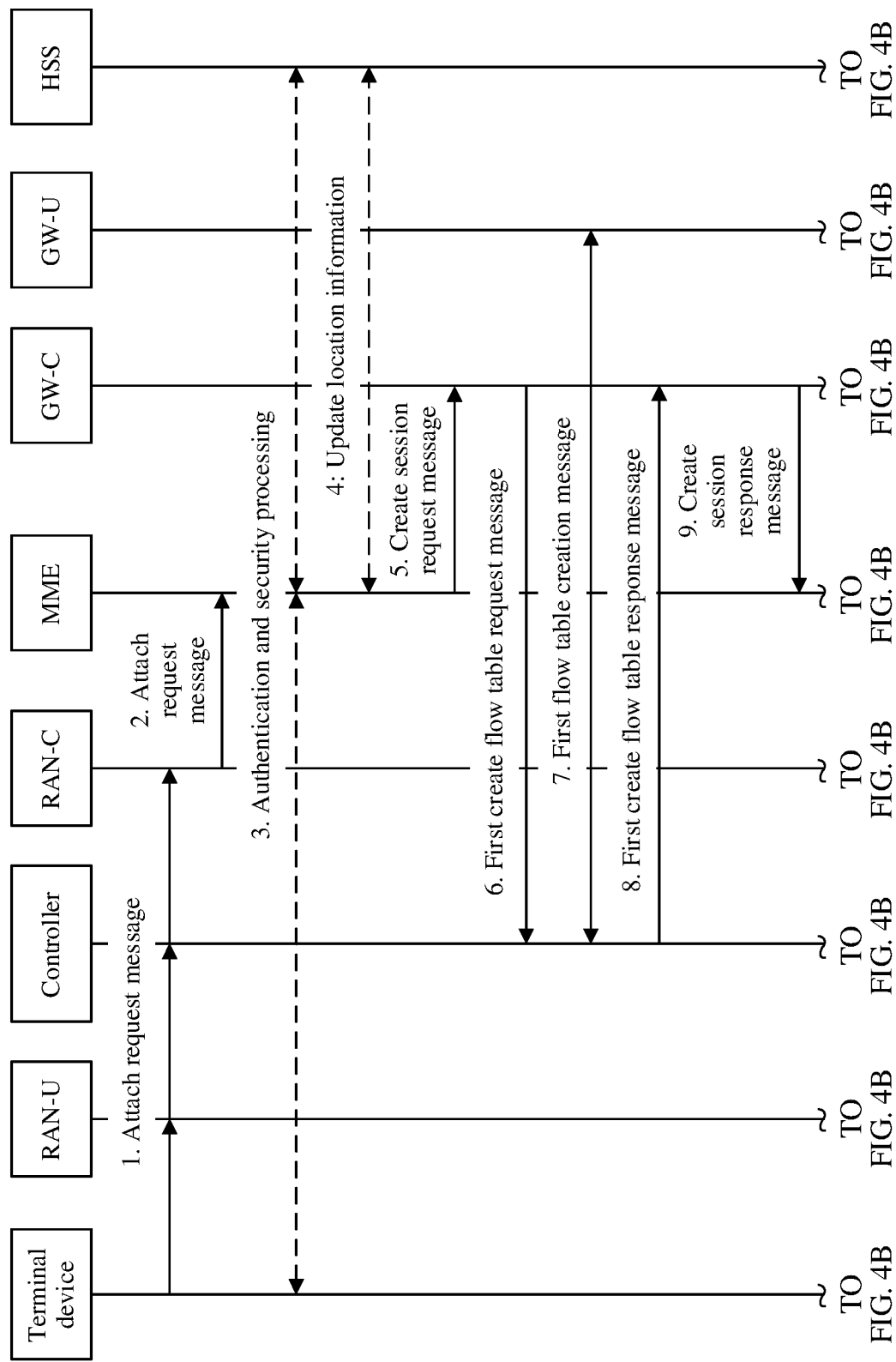
FIG. 4A is a schematic flowchart of a third embodiment of a buffer control method.
Figure 4B:
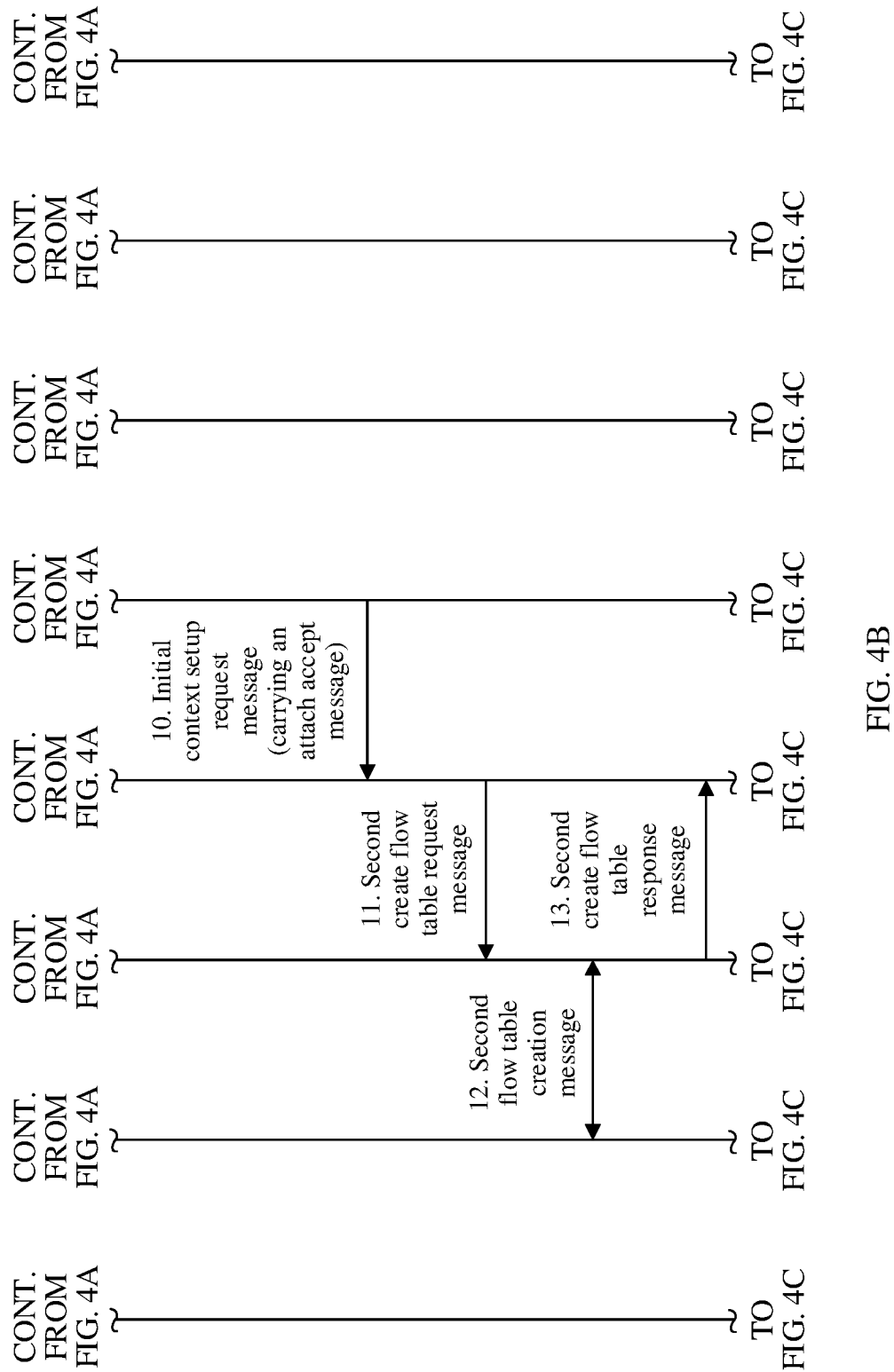
FIG. 4B is a schematic flowchart of a third embodiment of a buffer control method.
Figure 4C:
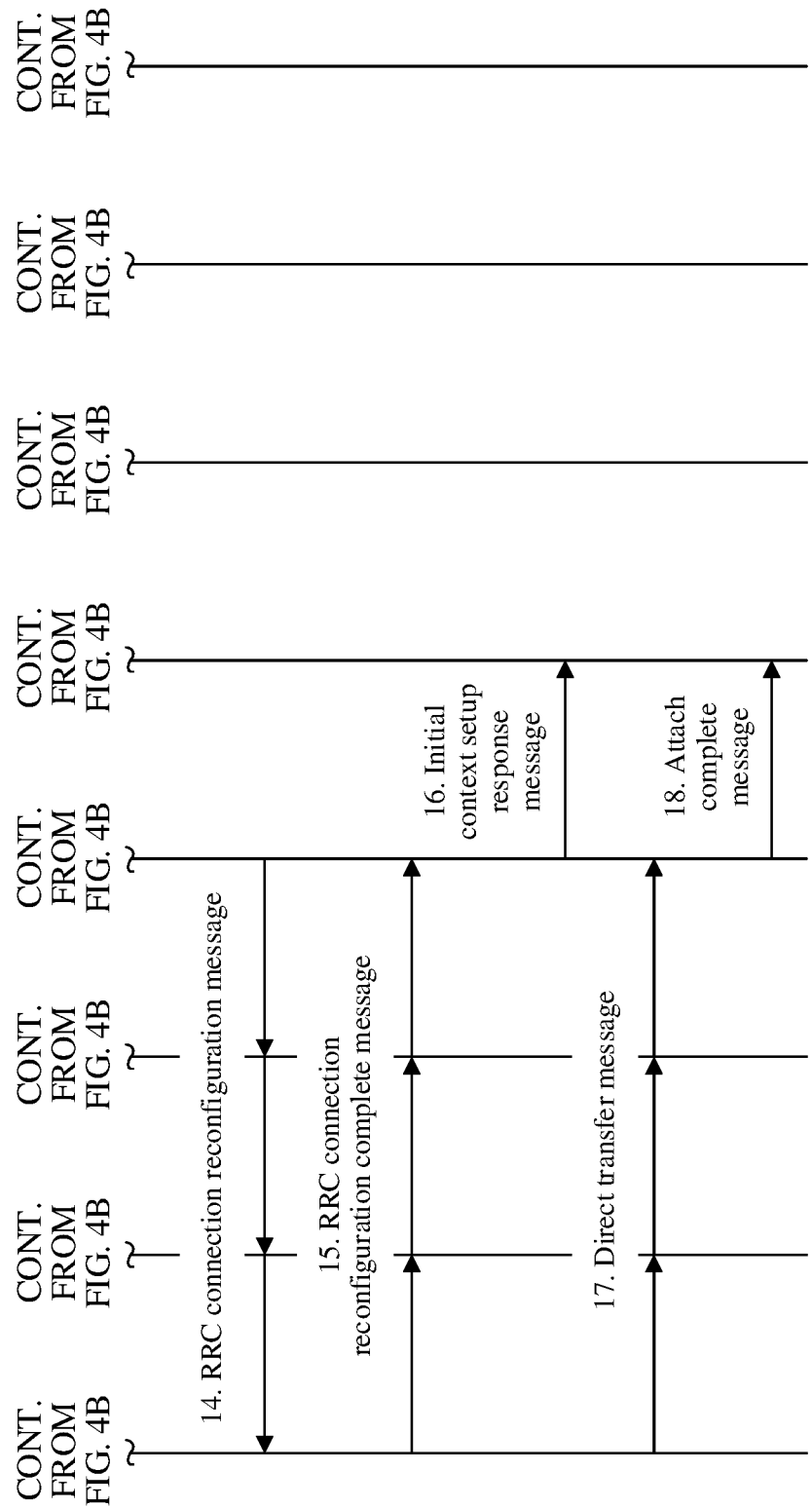
FIG. 4C is a schematic flowchart of a third embodiment of a buffer control method.
Figure 5A:
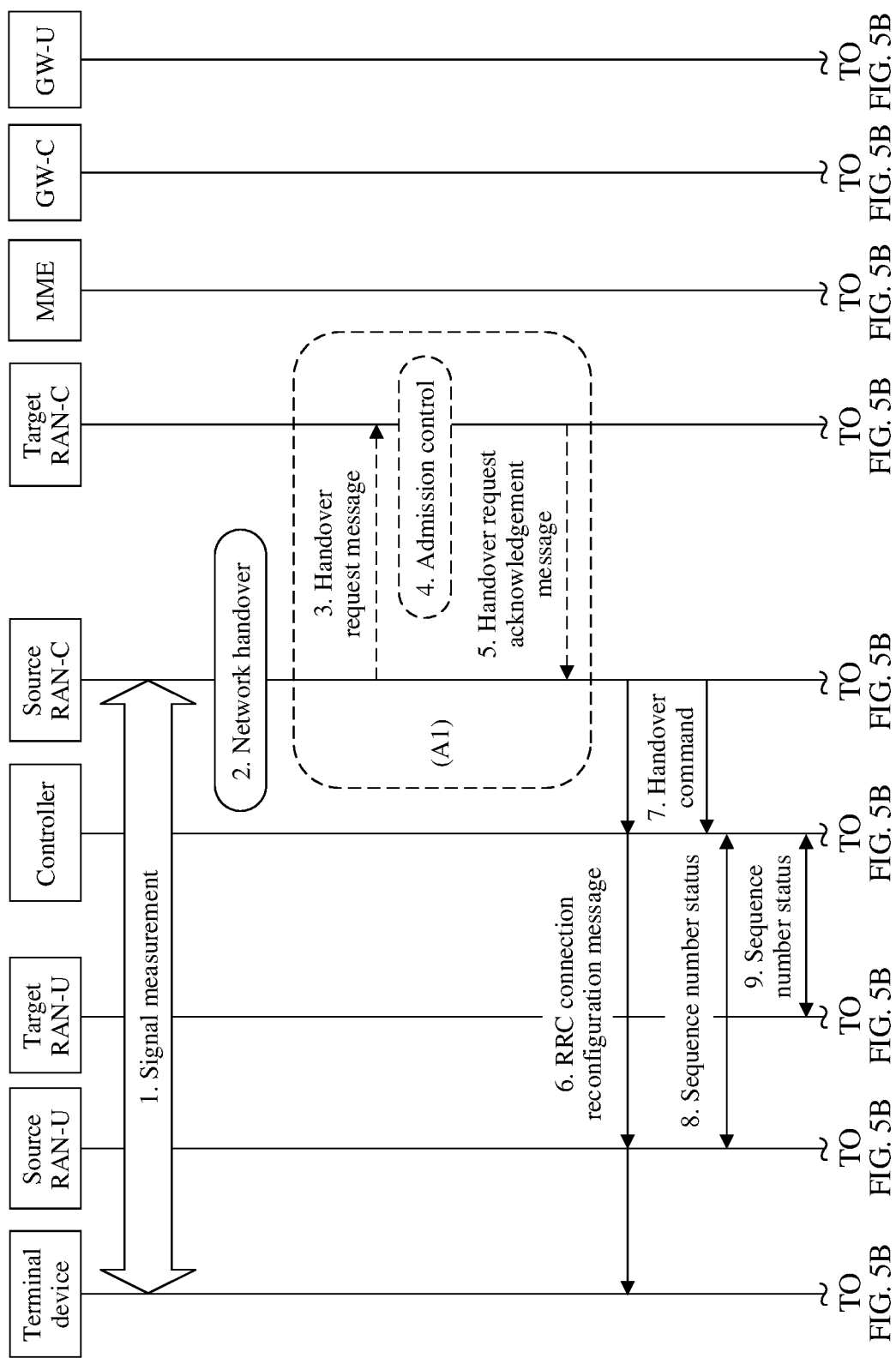
FIG. 5A is a schematic flowchart of a fourth embodiment of a buffer control method.
Figure 5B:
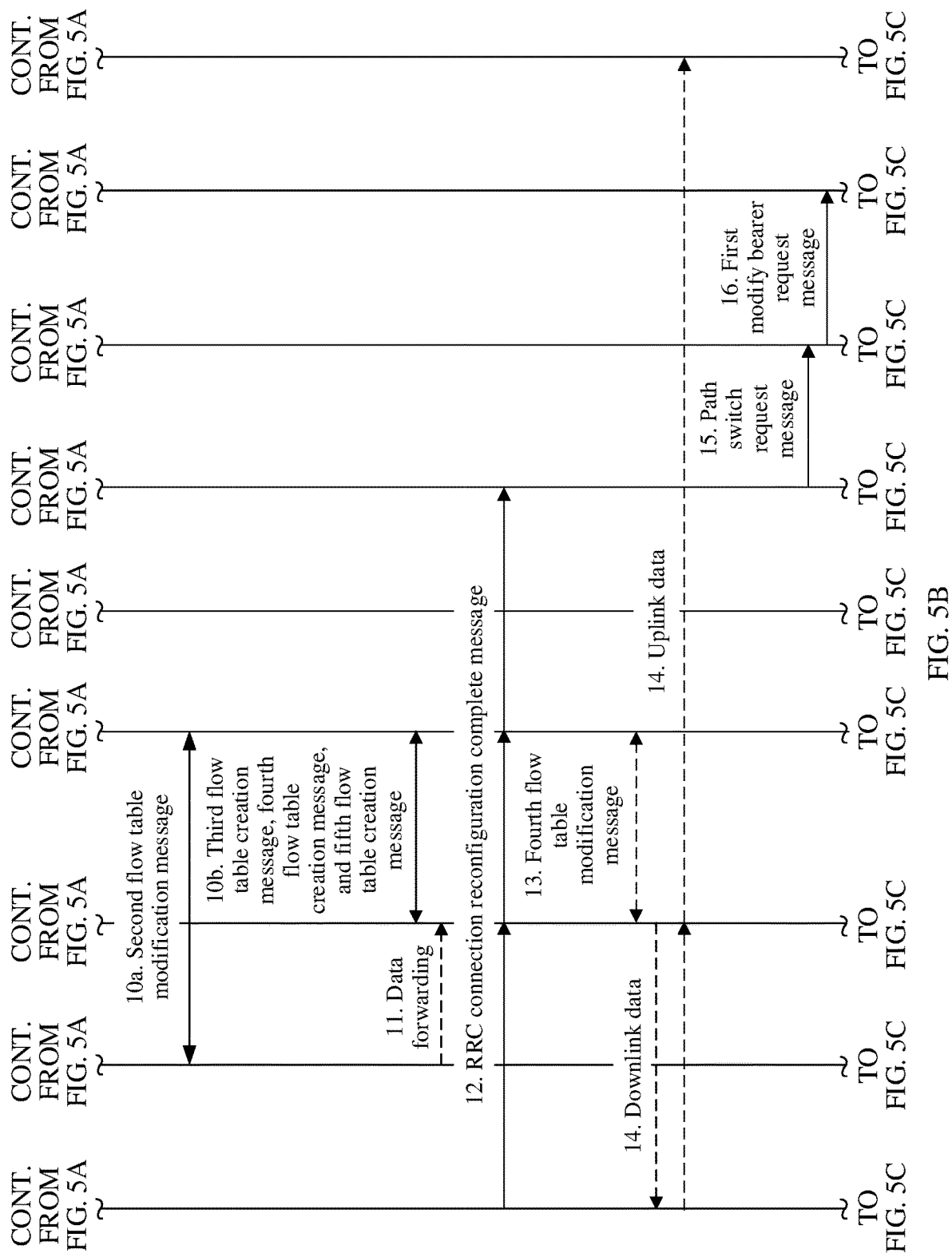
FIG. 5B is a schematic flowchart of a fourth embodiment of a buffer control method.
Figure 5C:
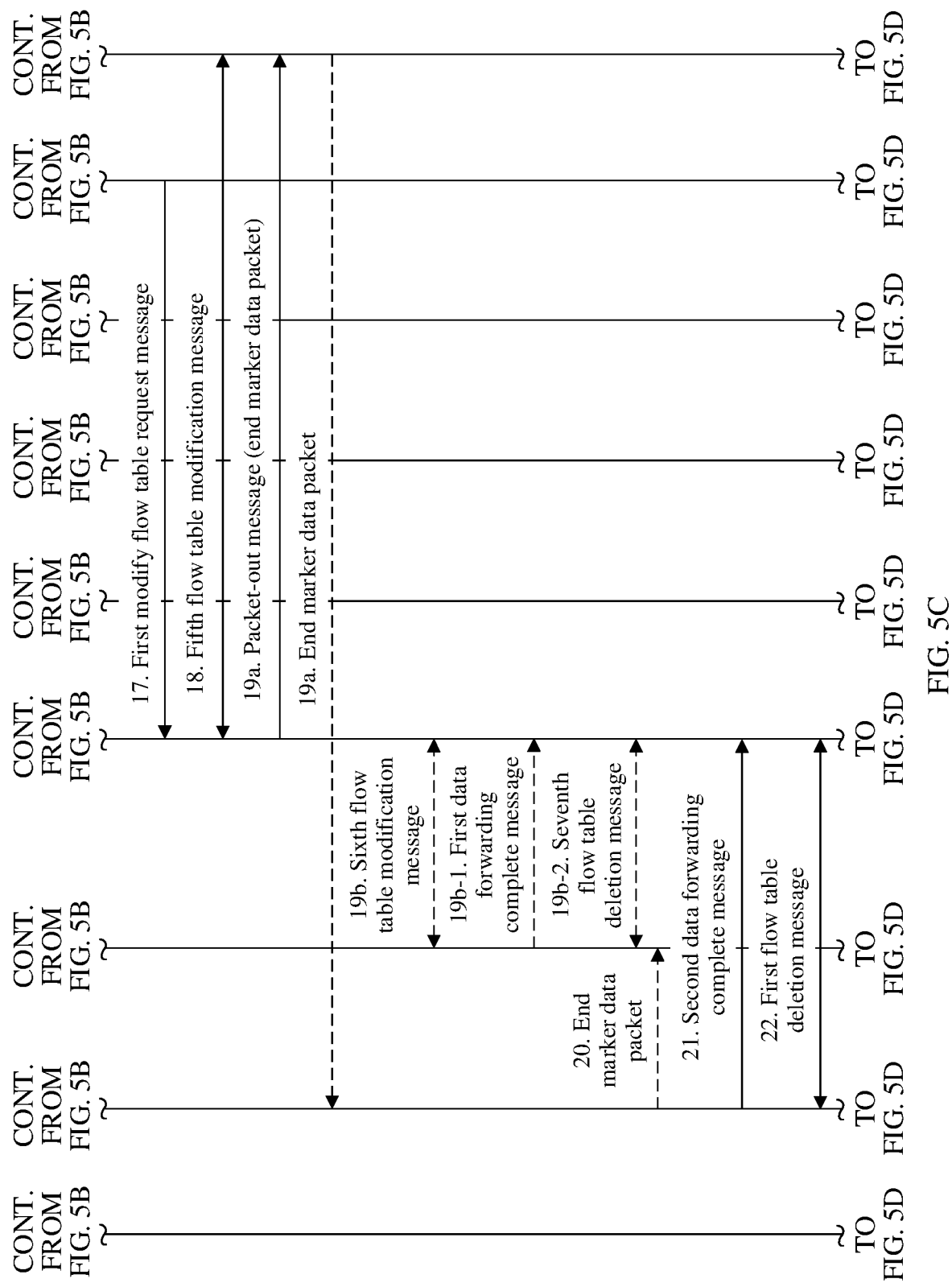
FIG. 5C is a schematic flowchart of a fourth embodiment of a buffer control method.
Figure 5D:
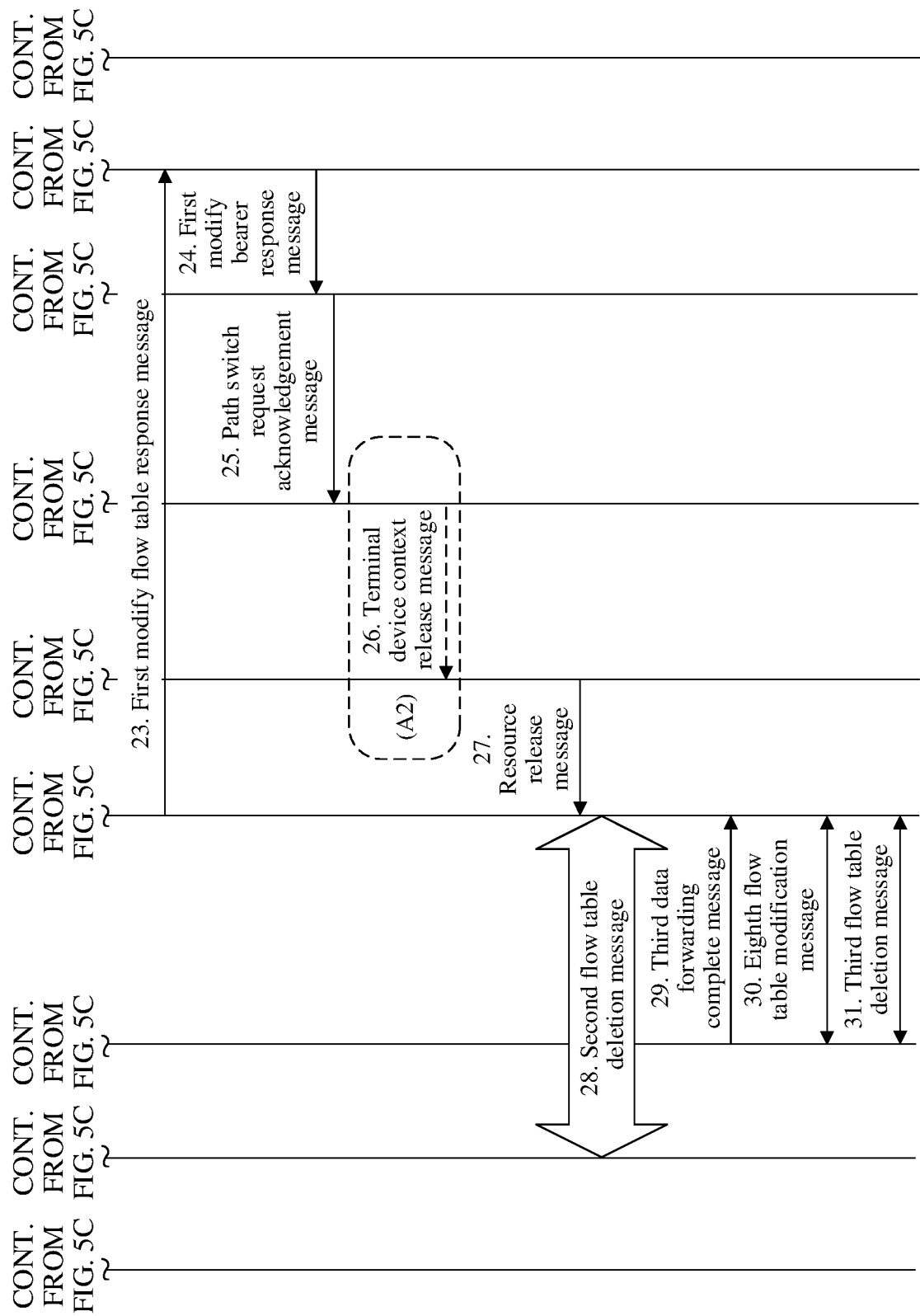
FIG. 5D is a schematic flowchart of a fourth embodiment of a buffer control method.

FIG. 4A, FIG. 4B, and FIG. 4C are schematic flowcharts of a third embodiment of a buffer control method. Based on the foregoing embodiments, in this embodiment, the buffer control method is applied to an attach procedure during access to a network by a terminal device. As shown in FIG. 4A, FIG. 4B, and FIG. 4C, the method of this embodiment may include the following steps:

Step 1: The terminal device sends an attach request message to a RAN-C by using a RAN-U and a controller.

Step 2: The RAN-C forwards the attach request message to an MME.

Step 3: The MME performs authentication/security processing (authentication/security) on the attach request message.

Step 4: The MME updates location information (update location) on a home subscriber server (HSS).

Step 5: The MME sends a create session request message to a GW-C, where the create session request message carries an identifier of the RAN-U.

Step 6: The GW-C sends a first create flow table request (create flow request) message to the controller, where the first create flow table request message is used to instruct the controller to control a GW-U to create a first downlink flow table, and the first create flow table request message carries an identifier of the GW-U, the identifier of the RAN-U (that is, an identifier of a target network element of a data flow matching the first downlink flow table), and an identifier of an access point name (APN) (that is, an identifier of a source network element of the data flow matching the first downlink flow table).

Step 7: The controller sends a first flow table creation message to the GW-U by using an OpenFlow protocol, where the first flow table creation message is used to instruct the GW-U to create the first downlink flow table to the RAN-U.

Step 8: The controller returns a first create flow table response (create flow response) message to the GW-C, where the first create flow table response message includes a flow table creation result.

Step 9: The GW-C returns a create session response message to the MME.

Step 10: The MME sends an initial context setup request message to the RAN-C, where the message carries an attach accept message.

Step 11: The RAN-C sends a second create flow table request (create flow request) message to the controller, where the second create flow table request message is used to instruct the controller to control the RAN-U to create a second downlink flow table, and the second create flow table request message carries the identifier of the RAN-U, the identifier of the GW-U (that is, an identifier of a source network element of a data flow matching the second downlink flow table), and an identifier of the terminal device (that is, an identifier of a target network element of the data flow matching the second downlink flow table).

Step 12: The controller sends a second flow table creation message to the RAN-U by using the OpenFlow protocol, where the second flow table creation message is used to instruct the RAN-U to create the second downlink flow table to the terminal device. Optionally, the second flow table creation message may include: an identifier (for example, a cookie) of the second downlink flow table and matching information of the second downlink flow table.

Considering that an air interface transmission rate (that is, a rate at which the RAN-U sends a data packet to the terminal device) may be less than a transmission rate from the GW-U to the RAN-U (that is, a receiving rate at which the RAN-U receives a data packet from the GW-U is greater than a forwarding rate at which the RAN-U forwards a data packet to the terminal device), the RAN-U needs to buffer a received data packet. Optionally, for the second flow table creation message in this embodiment, there may be at least the following two implementable manners:

First implementable manner: the second flow table creation message may further include buffer information of the second downlink flow table. Optionally, an action set of the second flow table creation message includes the buffer information of the second downlink flow table, where the buffer information of the second downlink flow table may include: buffer creation instruction information, a size of a storage space of a buffer, buffer type information, and a buffer creation trigger indication. The buffer type information includes saving and forwarding a received data packet, and the buffer creation trigger indication includes an indication of creating a buffer when a receiving rate of the RAN-U is greater than a forwarding rate of the RAN-U.

Second implementable manner: the second flow table creation message does not include the buffer information of the second downlink flow table (that is, the second flow table creation message is a normal flow table message in the prior art). When the RAN-U detects that the receiving rate is greater than the forwarding rate, the RAN-U reports a rate detection message to the controller, where the rate detection message carries an identifier of the second downlink flow table and a rate mismatching identifier, and the rate mismatching identifier is used to indicate that the receiving rate of the RAN-U is greater than the forwarding rate. Further, the controller determines, based on the identifier of the second downlink flow table and the rate mismatching identifier, that the RAN-U needs to create the buffer, and sends a first flow table modification message to the RAN-U by using the OpenFlow protocol. The first flow table modification message may include: the identifier of the second downlink flow table and the buffer information of the second downlink flow table. The buffer information of the second downlink flow table includes: buffer creation instruction information, a size of a storage space of a buffer, buffer type information, and a buffer creation trigger indication. The buffer type information includes saving and forwarding a received data packet, and the buffer creation trigger indication includes an indication of creating a buffer when the RAN-U receives the first flow table modification message.

Step 13: The controller returns a second create flow table response (create flow response) message to the RAN-C, where the second create flow table response message includes a flow table creation result.

Step 14: The RAN-C sends an RRC connection reconfiguration message to the terminal device by using the controller and the RAN-U.

Step 15: The terminal device returns an RRC connection reconfiguration complete message to the RAN-C.

Step 16: The RAN-C returns an initial context setup response message to the MME.

Step 17: The terminal sends a direct transfer message to the RAN-C by using the RAN-U and the controller, where the direct transfer message includes an attach complete message.

Step 18: The RAN-C sends the attach complete message to the MME.

Optionally, in this embodiment, sequence numbers of the foregoing steps do not limit an execution sequence, and the execution sequence of the steps may be properly adjusted. This is not limited in this embodiment.

It can be understood that in this embodiment, in an attach procedure in which the terminal device accesses a network, when a forwarding rate at which the RAN-U forwards downlink data to the terminal device is less than a rate at which the downlink data is received, the RAN-U performs data flow granularity-based buffering on the received downlink data, thereby meeting a data buffering requirement of a mobile network.

FIG. 5A, FIG. 5B, FIG. 5C, and FIG. 5D are schematic flowcharts of a fourth embodiment of a buffer control method. Based on the foregoing embodiments, in this embodiment, the buffer control method is applied to a network handover procedure triggered when a terminal device is in a connected mode and a location thereof is changed. As shown in FIG. 5A, FIG. 5B, FIG. 5C, and FIG. 5D, the method of this embodiment may include the following steps:

Note: When a RAN-C does not change, parts (A1) and (A2) are not performed; in addition, a target RAN-C and a source RAN-C in this embodiment are a same RAN-C, and may not be distinguished.

Step 1: The source RAN-C performs signal measurement on the terminal device.

Step 2: The source RAN-C determines, based on a signal measurement result, to perform network handover.

Step 3: The source RAN-C sends a handover request message to the target RAN-C.

Step 4: The target RAN-C performs admission control on the terminal device, to determine whether access of the terminal device is admitted.

Step 5: The target RAN-C replies to the source RAN-C with a handover request acknowledgement (handover request ACK) message.

Step 6: The source RAN-C sends an RRC connection reconfiguration message to the terminal device by using a controller and a source RAN-U.

Step 7: The source RAN-C sends a handover command to the controller, where the handover command is used to instruct the controller to hand over a user plane forwarding path. The handover command carries an identifier of the source RAN-U before the handover, an identifier of a target RAN-U after the handover, and an identifier of the terminal device, that is, the handover command notifies the controller that a specific terminal device is handed over from one RAN-U to another RAN-U.

Step 8: The controller obtains a sequence number status from the source RAN-U. Optionally, the sequence number status may be a PDCP sequence number status.

Step 9: The controller notifies the target RAN-U of the sequence number status.

Step 10a: The controller sends a second flow table modification message to the source RAN-U by using an OpenFlow protocol, where the second flow table modification message is used to instruct the source RAN-U to modify a target network element of a data flow matching a downlink flow table in the source RAN-U from the terminal device to the target RAN-U, so that the source RAN-U forwards all data packets originally to be forwarded to the terminal device to the target RAN-U.

Step 10b: The controller sends a third flow table creation message, a fourth flow table creation message, and a fifth flow table creation message to the target RAN-U by using the OpenFlow protocol. Optionally, the third flow table creation message, the fourth flow table creation message, and the fifth flow table creation message may alternatively be combined as one flow table creation message. This is not limited in this embodiment.

Optionally, the third flow table creation message is used to instruct the RAN-U to create a first uplink flow table (used to forward an uplink data packet from the terminal device to a GW-U), and the fourth flow table creation message is used to instruct the RAN-U to create a forwarding flow table (used to forward a to-be-forwarded data packet from the source RAN-U to the terminal device), and the fifth flow table creation message is used to instruct the RAN-U to create a third downlink flow table (used to forward a downlink data packet from the GW-U to the terminal device). Optionally, the third flow table creation message may include: an identifier of the first uplink flow table, matching information of the first uplink flow table, and buffer information of the first uplink flow table. The fourth flow table creation message may include: an identifier of the forwarding flow table and matching information of the forwarding flow table. The fifth flow table creation message may include: an identifier of the third downlink flow table, matching information of the third downlink flow table, and buffer information of the third downlink flow table.

(A) for the First Uplink Flow Table:

Considering that if the controller has not performed step 18 (that is, the controller determines that an uplink flow table in the GW-U can match only a data packet forwarded from the source RAN-U, and cannot match a data packet forwarded by the target RAN-U), the target RAN-U needs to buffer a data packet that needs to be sent to the GW-U, and after step 18 is completed (that is, the controller determines that the uplink flow table in the GW-U can match the data packet forwarded by the target RAN-U), forwards the buffered data packet to the GW-U. Optionally, for the third flow table creation message in this embodiment, there may be at least the following implementation:

Optionally, an action set of the third flow table creation message includes the buffer information of the first uplink flow table, where the buffer information of the first uplink flow table may include: buffer creation instruction information, a size of a storage space of a buffer, buffer type information, and a buffer creation trigger indication. The buffer type information includes saving a received data packet, and the buffer creation trigger indication includes an indication of creating a buffer when a receiving rate (that is, a rate of receiving the data packet matching the first uplink flow table) of the target RAN-U is greater than a forwarding rate (that is, a rate of forwarding a data packet matching the first uplink flow table) of the target RAN-U, that is, creating a buffer when the target RAN-U detects that the data packet matching the first uplink flow table arrives.

(B) For the Forwarding Flow Table:

Considering that when the target RAN-U receives a data packet from the source RAN-U, the controller has not received an RRC connection reconfiguration complete message that is in step 12 (for example, the controller determines that an air interface connection between the target RAN-U and the terminal device may have not been established), or because an air interface transmission rate (that is, a rate at which the target RAN-U sends a data packet to the terminal device) may be less than a transmission rate from the source RAN-U to the target RAN-U (that is, a receiving rate at which the target RAN-U receives a data packet from the source RAN-U is greater than a forwarding rate at which the target RAN-U forwards a data packet to the terminal device), the target RAN-U needs to buffer a received data packet. Optionally, for the fourth flow table creation message in this embodiment, there may be at least the following two implementations.

First implementation: the fourth flow table creation message may further include buffer information of the forwarding flow table. Optionally, an action set of the fourth flow table creation message includes the buffer information of the forwarding flow table, where the buffer information of the forwarding flow table may include: buffer creation instruction information, a size of a storage space of a buffer, buffer type information, and a buffer creation trigger indication. (a) If the controller has received an RRC connection reconfiguration complete message that is in step 12 (for example, the controller determines that an air interface connection between the target RAN-U and the terminal device has been established), the buffer type information includes saving and forwarding a received data packet, and the buffer creation trigger indication includes an indication of creating a buffer when a receiving rate of the target RAN-U is greater than a forwarding rate of the target RAN-U. (b) If the controller has not received an RRC connection reconfiguration complete message that is in step 12 (that is, the controller determines that an air interface connection between the target RAN-U and the terminal device may have not been established), the buffer type information includes saving a received data packet, and the buffer creation trigger indication includes an indication of creating a buffer when a receiving rate of the target RAN-U is greater than a forwarding rate of the target RAN-U.

Second implementation: the fourth flow table creation message does not include the buffer information of the forwarding flow table (that is, the fourth flow table creation message is a normal flow table message in the prior art). When the target RAN-U detects that the receiving rate is greater than the forwarding rate, the target RAN-U reports a rate detection message to the controller, where the rate detection message carries an identifier of the forwarding flow table and a rate mismatching identifier, and the rate mismatching identifier is used to indicate that the receiving rate of the target RAN-U is greater than the forwarding rate. Further, the controller determines, based on the identifier of the forwarding flow table and the rate mismatching identifier, that the target RAN-U needs to create the buffer, and sends a third flow table modification message to the target RAN-U by using the OpenFlow protocol. The third flow table modification message may include: the identifier of the forwarding flow table and the buffer information of the forwarding flow table. The buffer information may include: buffer creation instruction information, buffer type information, and a buffer creation trigger indication. (a) If the controller has received an RRC connection reconfiguration complete message that is in step 12 (for example, the controller determines that an air interface connection between the target RAN-U and the terminal device has been established), the buffer type information includes saving and forwarding a received data packet, and the buffer creation trigger indication includes an indication of creating a buffer when the target RAN-U receives the third flow table modification message. (b) If the controller has not received an RRC connection reconfiguration complete message that is in step 12 (that is, the controller determines that an air interface connection between the target RAN-U and the terminal device may have not been established), the buffer type information includes saving a received data packet, and the buffer creation trigger indication includes an indication of creating a buffer when the target RAN-U receives the third flow table modification message.

(C) For the Third Downlink Flow Table:

To ensure that the target RAN-U preferentially forwards the data packet of the source RAN-U to the terminal device, and then forwards the data packet of the GW-U to the terminal device, considering that when the target RAN-U receives the data packet from the GW-U, the controller may have not received a notification message that is in step 29 (that is, the controller determines that the target RAN-U has not completed forwarding the data packet from the source RAN-U), or because an air interface transmission rate (that is, a rate at which the target RAN-U sends a data packet to the terminal device) may be less than a transmission rate from the GW-U to the target RAN-U (that is, a receiving rate at which the target RAN-U receives a data packet from the GW-U is greater than a forwarding rate at which the target RAN-U forwards a data packet to the terminal device), the target RAN-U needs to buffer a received data packet. Optionally, for the fifth flow table creation message in this embodiment, there may be at least the following implementation.

Optionally, an action set of the fifth flow table creation message includes the buffer information of the third downlink flow table, where the buffer information of the third downlink flow table may include: buffer creation instruction information, a size of a storage space of a buffer, buffer type information, and a buffer creation trigger indication. (a) If the controller has received a notification message that is in step 29 (that is, the controller determines that the target RAN-U has completed forwarding a data packet from the source RAN-U), the buffer type information includes saving and forwarding a received data packet, and the buffer creation trigger indication includes an indication of creating a buffer when a receiving rate of the target RAN-U is greater than a forwarding rate of the target RAN-U. (b) If the controller has not received a notification message that is in step 29 (that is, the controller determines that the target RAN-U has not completed forwarding the data packet from the source RAN-U), the buffer type information includes saving a received data packet, and the buffer creation trigger indication includes an indication of creating a buffer when a receiving rate of the target RAN-U is greater than a forwarding rate of the target RAN-U.

Step 11: Because the network element of the data flow matching the downlink flow table in the source RAN-U is modified from the terminal device to the target RAN-U in step 10a, in this step, the source RAN-U forwards all data packets originally to be forwarded to the terminal device to the target RAN-U.

Step 12: The terminal sends an RRC connection reconfiguration complete message to the target RAN-C by using the target RAN-U and the controller to indicate that establishment of the air interface connection has been completed.

Step 13: When the controller is performing step 10b but has not received the RRC connection reconfiguration complete message that is in step 12, the buffer type information of the fourth flow table creation message that is in step 10b includes saving the received data packet. Therefore, after the controller receives the RRC connection reconfiguration complete message that is in step 12, the controller sends a fourth flow table modification message to the target RAN-U. The fourth flow table modification message may include: the identifier of the forwarding flow table, buffer modification instruction information, and buffer type information. The buffer type information includes saving and forwarding the received data packet, so that the target RAN-U smoothly forwards, to the terminal device, the data packet from the source RAN-U.

Optionally, when the controller is performing step 10b and has received the RRC connection reconfiguration complete message that is in step 12, step 13 does not need to be performed.

Step 14: The target RAN-U sends downlink data to the terminal device based on the forwarding flow table and/or the third downlink flow table. In addition, the target RAN-U forwards, to the GW-U based on the first uplink flow table, an uplink data packet from the terminal device.

Step 15: After receiving the RRC connection reconfiguration complete message that is in step 12, the target RAN-C sends a path switch request message to an MME.

Step 16: The MME sends a first modify bearer request message to a GW-C.

Step 17: The GW-C sends a first modify flow table request message to the controller, where the first modify flow table request message is used to instruct the controller to modify uplink and downlink flow tables of the GW-U, and the first modify flow table request message carries an identifier of the GW-U, an identifier of the target RAN-U (that is, an identifier of a target network element of a data flow matching the downlink flow table in the GW-U), an identifier of the terminal device, and an identifier of an APN (used to identify a target network element of a data flow matching the uplink flow table in the GW-U).

Step 18: The controller sends a fifth flow table modification message to the GW-U by using the OpenFlow protocol, where the fifth flow table modification message is used to instruct the GW-U to modify the uplink and downlink flow tables in the GW-U, so that the GW-U can correctly forward the data packet from the target RAN-U, and can correctly send the data packet to the target RAN-U.

Step 19a: After performing step 18, the controller sends a packet-out message to the GW-U by using the OpenFlow protocol, and forwards the packet-out message to the source RAN-U by using the GW-U. The packet-out message carries an end marker data packet, and the end marker data packet is used to indicate that the data packet of the GW-U has been sent to the source RAN-U.

Step 19b: After performing step 18, if the buffer type information of the third flow table creation message in step 10b includes saving the received data packet, the controller sends a sixth flow table modification message to the target RAN-U by using the OpenFlow protocol. The sixth flow table modification message may include: an identifier of a first uplink flow table, buffer modification instruction information, and buffer type information. The buffer type information includes saving and forwarding the received data packet, so that the target RAN-U forwards the data packet to the GW-U.

Step 19b-1: If step 19b is performed, when the buffer corresponding to the first uplink flow table created in step 10b is empty or an action of creating the buffer corresponding to the first uplink flow table is not triggered, the target RAN-U reports a first data forwarding complete message to the controller, where the first data forwarding complete message carries the identifier of the first uplink flow table.

Step 19b-2: After receiving the first data forwarding complete message that is reported by the target RAN-U in step 19b-1, the controller sends a seventh flow table modification message to the target RAN-U by using the OpenFlow protocol. The seventh flow table modification message includes: the identifier of the first uplink flow table, matching information, and buffer deletion instruction information. The buffer deletion instruction information is used to instruct the target RAN-U to delete the buffer of the first uplink flow table.

Step 20: The source RAN-U forwards, to the target RAN-U, the end marker data packet from the GW-U.

Step 21: When step 20 is performed and the buffer corresponding to the downlink flow table in the source RAN-U is empty, the source RAN-U sends a second data forwarding complete message to the controller, to notify the controller that a data packet from the source RAN-U to the target RAN-U has been forwarded, where the second data forwarding complete message carries the identifier (for example, cookie information) of the downlink flow table in the source RAN-U.

Step 22: After receiving the second data forwarding complete message that is in step 21, the controller sends a first flow table deletion message (used to instruct the source RAN-U to delete the downlink flow table in the source RAN-U) to the source RAN-U by using the OpenFlow protocol, where the first flow table deletion message includes the identifier of the downlink flow table in the source RAN-U.

Step 23: The controller returns a first modify flow table response (modify flow response) message to the GW-C.

Step 24: The GW-C returns a first modify bearer response message to the MME.

Step 25: The MME returns a path switch request acknowledgement message to the target RAN-C.

Step 26: The target RAN-C sends a terminal device context release (UE context release) message to the source RAN-C, to instruct the source RAN-C to release the terminal device context information.

Step 27: The source RAN-C sends a resource release message to the controller, where the resource release message carries the identifier of the terminal device and the identifier of the source RAN-U, and is used to instruct the controller to release a resource that corresponds to the terminal device and that is on the corresponding RAN-U.

Step 28: The controller determines a corresponding flow table based on the identifier of the terminal device and the identifier of the source RAN-U, and sends a second flow table deletion message (used to instruct the source RAN-U to delete the corresponding flow table) to the source RAN-U by using the OpenFlow protocol.

Step 29: When the target RAN-U detects that a data packet in a buffer (used to buffer a data packet from the source RAN-U) corresponding to the forwarding flow table created in step 10b has been forwarded (that is, the buffer corresponding to the forwarding flow table is empty and the end marker data packet has been received), the target RAN-U sends a third data forwarding complete message to the controller, where the third data forwarding complete message carries the identifier of the forwarding flow table.

Step 30: After the controller receives the third data forwarding complete message in step 29, the controller determines that the target RAN-U has forwarded the data packet from the source RAN-U, so that the target RAN-U may start to forward the data packet from the GW-U. If the buffer type information of the buffer corresponding to the third downlink flow table created in step 10*b* includes saving and forwarding a received data packet, this step does not need to be performed. If the buffer type information of the buffer corresponding to the third downlink flow table created in step 10*b* includes saving a received data packet, an eighth flow table modification message needs to be sent to the target RAN-U by using the OpenFlow protocol. The eighth flow table modification message may include: an identifier of a third downlink flow table, buffer modification instruction information, and buffer type information. The buffer type information includes saving and forwarding a received data packet, so that the target RAN-U starts to forward the data packet from the GW-U.

Step 31: After receiving the third data forwarding complete message that is in step 29, the controller sends a third flow table deletion message to the target RAN-U by using the OpenFlow protocol, where the third flow table deletion message carries the identifier of the forwarding flow table, used to instruct the target RAN-U to delete the forwarding flow table.

Optionally, in this embodiment, sequence numbers of the foregoing steps do not limit an execution sequence, and the execution sequence of the steps may be properly adjusted. In other words, the steps shown in this embodiment may be performed in any of a variety of orders. This is not limited in this embodiment.

It can be understood that in this embodiment, in a network handover procedure, when an air interface connection of the terminal device has been released and the target RAN-U receives downlink data that needs to be sent to the terminal device, the target RAN-U cannot continue to forward the downlink data. In this case, the target RAN-U performs data flow granularity-based buffering on the downlink data. When a forwarding rate at which the target RAN-U forwards the downlink data to the terminal device is less than a rate at which the target RAN-U receives the downlink data, the target RAN-U performs data flow granularity-based buffering on the received downlink data. In addition, when the terminal device performs network handover, the target RAN-U needs to separately receive downlink data from the source RAN-U and downlink data from the GW-U. To ensure that the downlink data from the source RAN-U is preferentially forwarded, the RAN-U performs data flow granularity-based buffering on the downlink data from the GW-U, so that a data buffering requirement of a mobile network can be met.

Figure 6A:
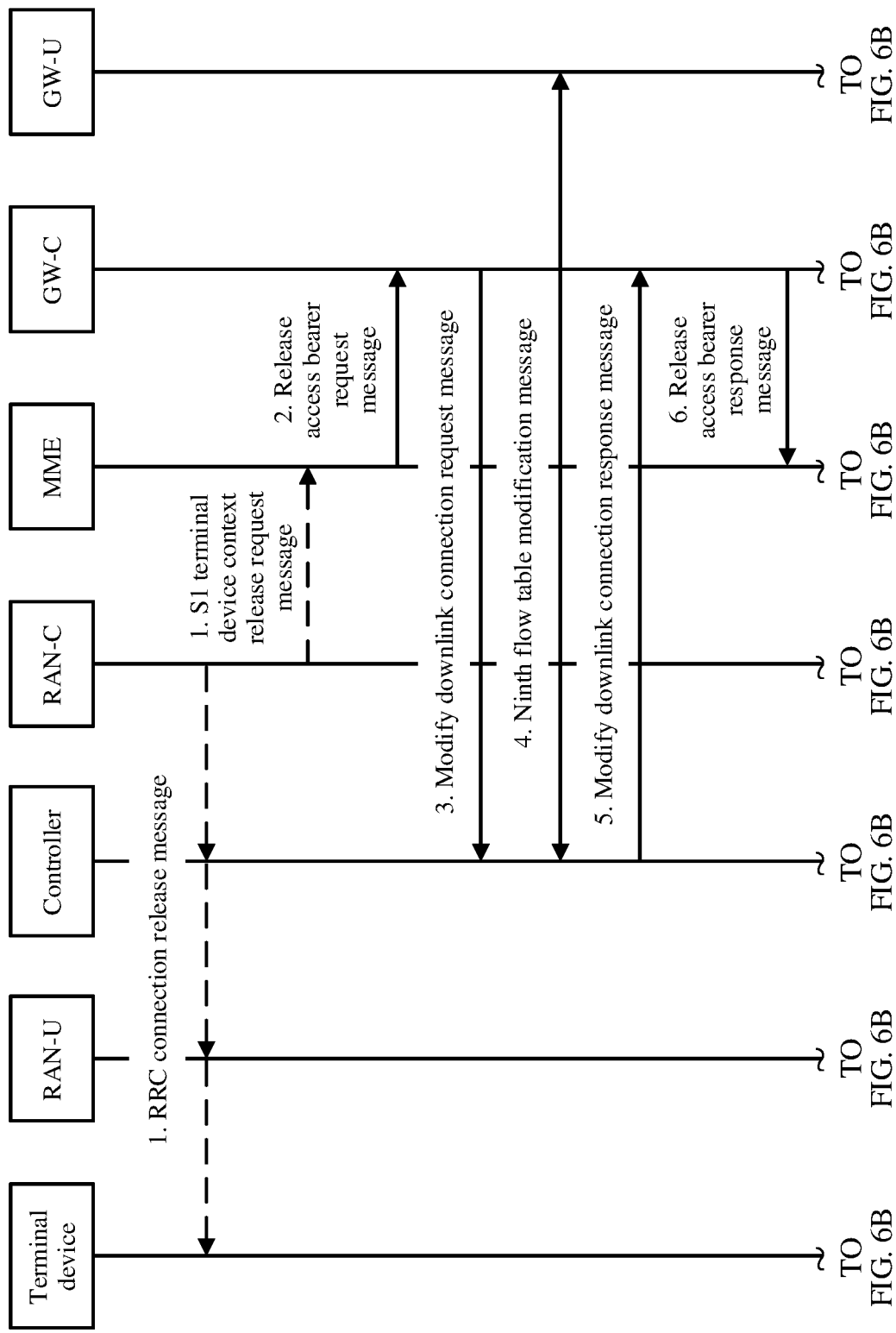
FIG. 6A is a schematic flowchart of a fifth embodiment of a buffer control method.
Figure 6B:
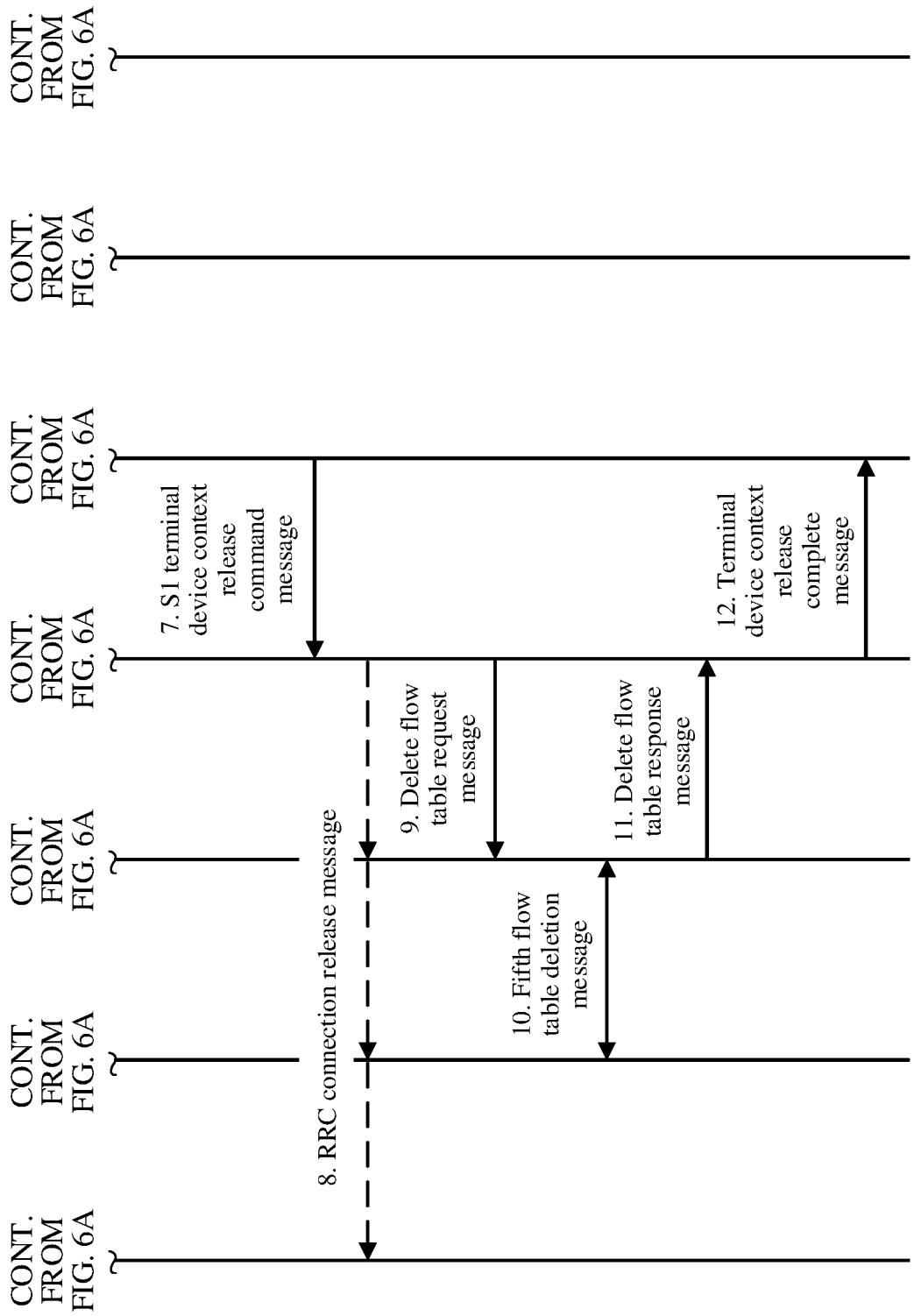
FIG. 6B is a schematic flowchart of a fifth embodiment of a buffer control method.

FIG. 6A and FIG. 6B are schematic flowcharts of a fifth embodiment of a buffer control method. Based on the foregoing embodiments, in this embodiment, the buffer control method is applied to an S1 connection release procedure triggered when no service occurs on a terminal device for a time period. As shown in FIG. 6A and FIG. 6B, the method of this embodiment may include the following steps:

Step 1: A RAN-C sends an RRC connection release message (used to instruct the terminal device to release an RRC connection) to the terminal device by using a controller and a RAN-U, and the RAN-C sends an S1 context release request (S1 UE context release request) message of the terminal device to an MME by using an S1-AP interface.

Step 2: The MME sends a release access bearer request message to a GW-C, to request the GW-C to release an S1 connection of the terminal device.

Step 3: The GW-C sends a modify downlink connection request (modify downlink request) message to the controller, where the downlink connection request message carries an identifier of a GW-U, an identifier of the RAN-U, and an identifier of the terminal device. That is, the modify downlink connection request message is used to instruct the controller to modify a fourth downlink flow table that corresponds to the terminal device and that is from the GW-U to the RAN-U.

Step 4: The controller determines the fourth downlink flow table based on the downlink connection request message, and sends a ninth flow table modification message to the GW-U by using an OpenFlow protocol. The ninth flow table modification message may include: an identifier, matching information, and buffer information of the fourth downlink flow table. The buffer information includes: buffer creation instruction information, buffer type information, and a buffer creation trigger indication. The buffer type information includes saving a received data packet, and the buffer creation trigger indication includes an indication of creating a buffer when a receiving rate (that is, a rate of receiving a data packet matching the fourth downlink flow table) of the GW-U is greater than a forwarding rate (that is, a rate of forwarding the data packet matching the fourth downlink flow table) of the GW-U.

Step 5: The controller replies to the GW-C with a modify downlink connection response (modify downlink response) message.

Step 6: The GW-C replies to the MME with a release access bearer response message.

Step 7: The MME sends an S1 context release command (S1 UE context release command) message of the terminal device to the RAN-C, to release the S1 connection.

Step 8: If the RRC connection has not been released, the RAN-C sends an RRC connection release message to the terminal device.

Step 9: After receiving the S1 context release command message of the terminal device that is in step 7, the RAN-C sends a delete flow table request (delete flow request) message to the controller. The delete flow table request message carries the identifier of the RAN-U and the identifier of the terminal device.

Step 10: The controller determines corresponding uplink and downlink flow tables based on the identifier of the RAN-U and the identifier of the terminal device that are in the delete flow table request message, and sends a fourth flow table deletion message (used to instruct the RAN-U to delete the corresponding uplink and downlink flow tables and buffers corresponding to the uplink and downlink flow tables) to the RAN-U by using the OpenFlow protocol.

Step 11: The controller returns a delete flow table response (delete flow response) message to the RAN-C.

Step 12: The RAN-C sends an S1 context release complete (S1 UE context release command) message of the terminal device to the MME.

Optionally, in this embodiment, sequence numbers of the foregoing steps do not limit an execution sequence, and the execution sequence of the steps may be properly adjusted. In other words, the steps shown in this embodiment may be performed in any of a variety of orders. This is not limited in this embodiment.

It can be understood that in this embodiment, in an S1 connection release procedure, when the terminal device is in an idle mode (for example, an air interface connection and the S1 connection have been released) and the GW-U receives downlink data to be sent to the terminal device, the GW-U cannot continue to forward the downlink data. Therefore, the GW-U performs data flow granularity-based buffering on the downlink data, to wait for establishment of the air interface connection and the S1 connection, thereby meeting a data buffering requirement of a mobile network.

Figure 7A:
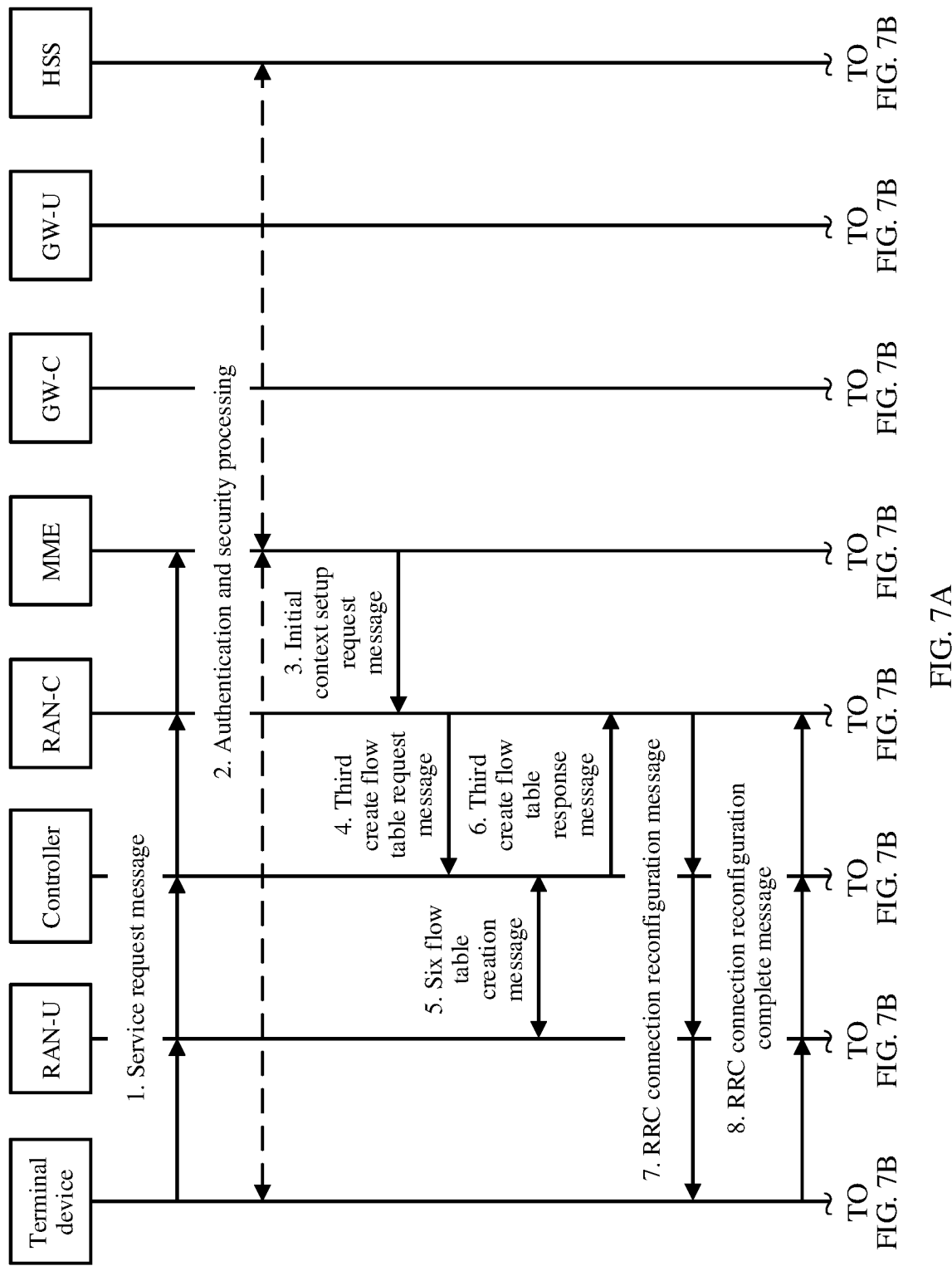
FIG. 7A is a schematic flowchart of a sixth embodiment of a buffer control method.
Figure 7B:
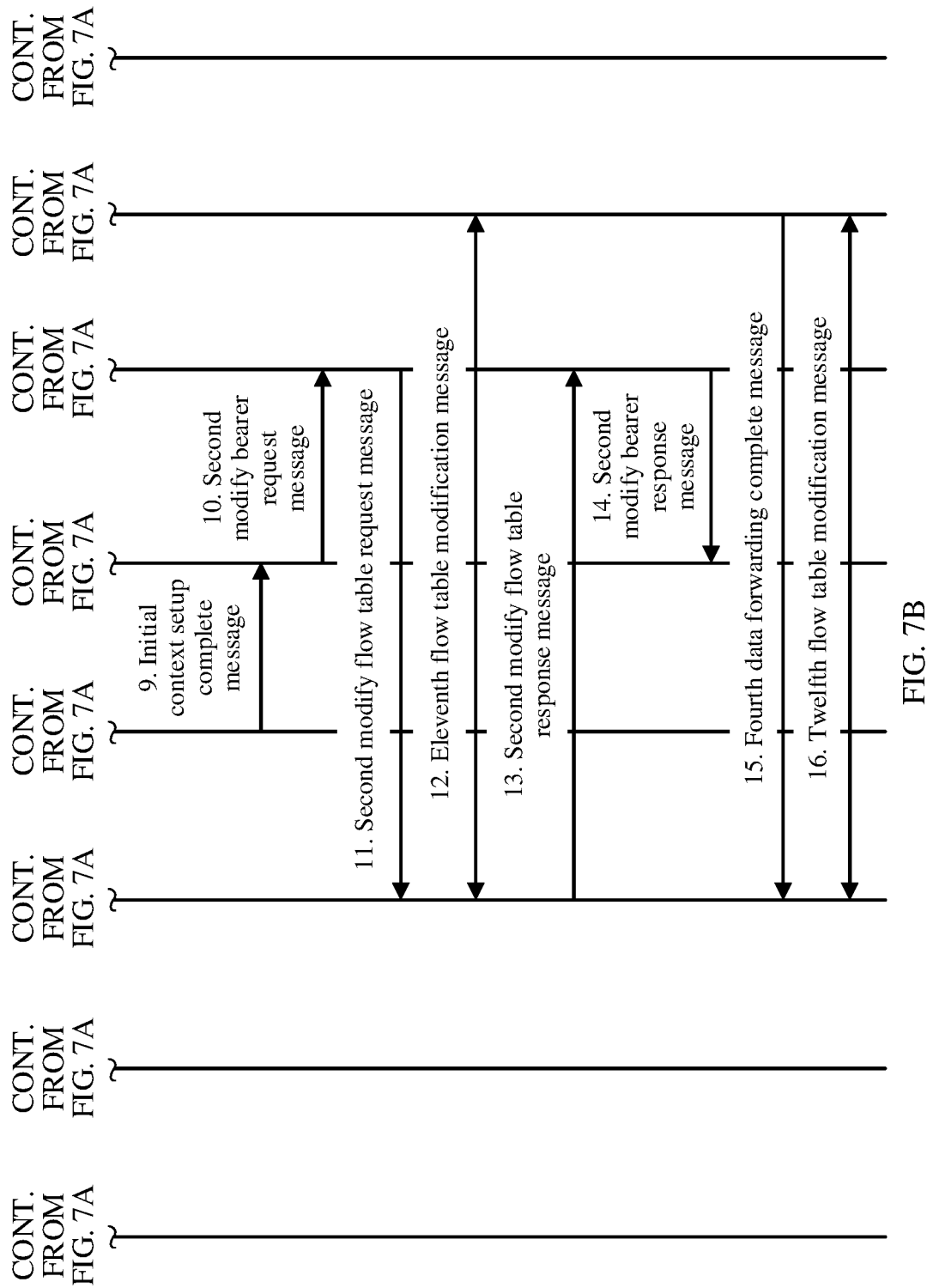
FIG. 7B is a schematic flowchart of a sixth embodiment of a buffer control method.

FIG. 7A and FIG. 7B are schematic flowcharts of a sixth embodiment of a buffer control method. Based on the foregoing embodiments, in this embodiment, the buffer control method is applied to a service request procedure triggered when a terminal device is in a connected mode and intends to initiate a service. As shown in FIG. 7A and FIG. 7B, the method of this embodiment may include the following steps:

Step 1: A terminal device sends a service request message to an MME. Optionally, the service request message may be carried in a non-access stratum (NAS) message.

Step 2: The MME performs authentication and security processing (authentication/security) on the service request message of the UE.

Step 3: The MME sends an initial context setup request message to a RAN-C. Optionally, the MME may send the initial context setup request message by using an S1-AP interface.

Step 4: The RAN-C sends a third create flow table request message to a controller, where the third create flow table request message is used to instruct the controller to control a RAN-U to create a fifth downlink flow table, and the third create flow table request message carries an identifier of the RAN-U, an identifier of a GW-U (that is, an identifier of a source network element of a data flow matching the fifth downlink flow table), and an identifier of the terminal device (that is, an identifier of a target network element of the data flow matching the fifth downlink flow table).

Step 5: The controller sends a six flow table creation message to the RAN-U by using an OpenFlow protocol, where the six flow table creation message is used to instruct the RAN-U to create the fifth downlink flow table to the terminal device. Optionally, the six flow table creation message may include: an identifier and matching information of the fifth downlink flow table.

Considering that an air interface transmission rate (that is, a rate at which the RAN-U sends a data packet to the terminal device) may be less than a transmission rate from the GW-U to the RAN-U (that is, a receiving rate at which the RAN-U receives a data packet from the GW-U is greater than a forwarding rate at which the RAN-U forwards a data packet to the terminal device), the RAN-U needs to buffer a received data packet. Optionally, for the sixth flow table creation message in this embodiment, there may be at least the following two implementations.

First implementation: the sixth flow table creation message may further include buffer information of the fifth downlink flow table. Optionally, an action set of the sixth flow table creation message includes the buffer information of the fifth downlink flow table, where the buffer information of the fifth downlink flow table may include: buffer creation instruction information, a size of a storage space of a buffer, buffer type information, and a buffer creation trigger indication. The buffer type information includes saving and forwarding a received data packet, and the buffer creation trigger indication includes an indication of creating a buffer when a receiving rate of the RAN-U is greater than a forwarding rate of the RAN-U.

Second implementation: the sixth flow table creation message does not include the buffer information of the fifth downlink flow table (that is, the sixth flow table creation message is a normal flow table message in the prior art). When the RAN-U detects that the receiving rate is greater than the forwarding rate, the RAN-U reports a rate detection message to the controller, where the rate detection message carries: an identifier of the fifth downlink flow table and a rate mismatching identifier, and the rate mismatching identifier is used to indicate that the receiving rate of the RAN-U is greater than the forwarding rate. Further, the controller determines, based on the identifier of the fifth downlink flow table and the rate mismatching identifier, that the RAN-U needs to create the buffer, and sends a tenth flow table modification message to the RAN-U by using the OpenFlow protocol. The tenth flow table modification message may include: the identifier of the fifth downlink flow table and the buffer information of the fifth downlink flow table. The buffer information of the fifth downlink flow table includes: buffer creation instruction information, a size of a storage space of a buffer, buffer type information, and a buffer creation trigger indication. The buffer type information includes saving and forwarding a received data packet, and the buffer creation trigger indication includes an indication of creating a buffer when the RAN-U receives a ninth flow table modification message.

Step 6: The controller returns a third create flow table response message to the RAN-C, where the third create flow table response message includes a flow table creation result.

Step 7: The RAN-C sends an RRC connection reconfiguration message to the terminal device by using the controller and the RAN-U.

Step 8: The terminal device returns an RRC connection reconfiguration complete message to the RAN-C.

Step 9: The RAN-C sends an initial context setup complete message to the MME.

Step 10: The MME sends a second modify bearer request message to a GW-C.

Step 11: The GW-C sends a second modify flow table request (modify flow request) message to the controller, where the second modify flow table request message is used to instruct the controller to modify a sixth downlink flow table in the GW-U, and the second modify flow table request message carries the identifier of the GW-U, the identifier of the RAN-U, the identifier of the terminal device, and an identifier of an APN.

Step 12. The controller sends an eleventh flow table modification message to the GW-U by using the OpenFlow protocol. The eleventh flow table modification message may include: an identifier, matching information, and buffer information of the sixth downlink flow table. The buffer information of the sixth downlink flow table may include: buffer modification instruction information and buffer type information. The buffer type information includes saving and forwarding a received data packet, so that the GW-U sends the data packet to the RAN-U.

Step 13: The controller returns a second modify flow table response (modify flow response) message to the GW-C.

Step 14: The GW-C returns a second modify bearer response message to the MME.

Step 15: When the GW-U detects that a buffer (used to buffer a downlink data packet to be sent to the terminal device) corresponding to the sixth downlink flow table created in an S1 connection release procedure is empty, the GW-U sends a fourth data forwarding complete message to the controller, where the fourth data forwarding complete message carries the identifier of the sixth downlink flow table.

Step 16: After receiving the fourth data forwarding complete message that is in step 15, the controller sends a twelfth flow table modification message to the GW-U by using the OpenFlow protocol. The twelfth flow table modification message may include: the identifier, the matching information, and buffer deletion instruction information of the sixth downlink flow table. The buffer deletion instruction information is used to instruct the GW-U to delete the buffer corresponding to the sixth downlink flow table.

Optionally, in this embodiment, sequence numbers of the foregoing steps do not limit an execution sequence, and the execution sequence of the steps may be properly adjusted. In other words, the steps shown in this embodiment may be performed in any of a variety of orders. This is not limited in this embodiment.

It can be understood that in this embodiment, in a service request procedure, when a forwarding rate at which the RAN-U forwards downlink data to the terminal device is less than a rate at which the RAN-U receives the downlink data, the RAN-U performs data flow granularity-based buffering on the received downlink data, thereby meeting a data buffering requirement of a mobile network.

Additionally, the buffer control method may alternatively be applied to another case. This is not limited in this embodiment.

Figure 8:
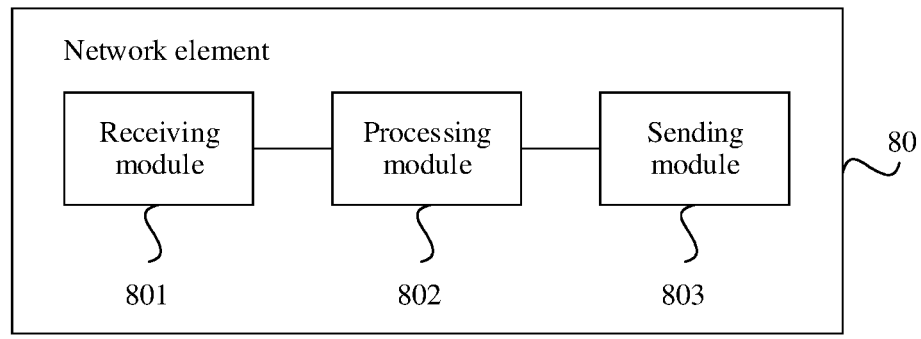
FIG. 8 is a schematic structural diagram of a first embodiment of a network element.

FIG. 8 is a schematic structural diagram of a first embodiment of a network element. As shown in FIG. 8, the network element 80 provided in this embodiment may include: a receiving module 801, a processing module 802, and a sending module 803.

The receiving module 801 is configured to receive a flow table message from a controller, where the flow table message includes buffer information of a data packet matching a flow table.

The processing module 802 is configured to process a buffer of the data packet based on the buffer information.

The sending module 803 is configured to send a flow table response message to the controller.

Optionally, the buffer information includes buffer creation instruction information, buffer modification instruction information, or buffer deletion instruction information.

Optionally, the buffer information includes buffer type information, and the buffer type information is used to indicate a saving manner of the data packet.

Optionally, the buffer type information includes: saving a received data packet, or saving and forwarding a received data packet.

Optionally, the buffer information includes a buffer creation trigger indication, and the buffer creation trigger indication is used to indicate a creation occasion of the buffer.

Optionally, the buffer creation trigger indication includes: an indication of creating the buffer when the network element receives the flow table message, or an indication of creating the buffer when a receiving rate of the network element is greater than a forwarding rate of the network element.

Optionally, the buffer information includes a size of a storage space of the buffer.

Optionally, the buffer information is located in an action set field of the flow table message.

The network element in this embodiment may be used to perform the technical solution in any of the first embodiment to the sixth embodiment of the buffer control method. Their implementation principles and technical effects are similar, and details are not described herein again.

Figure 9:
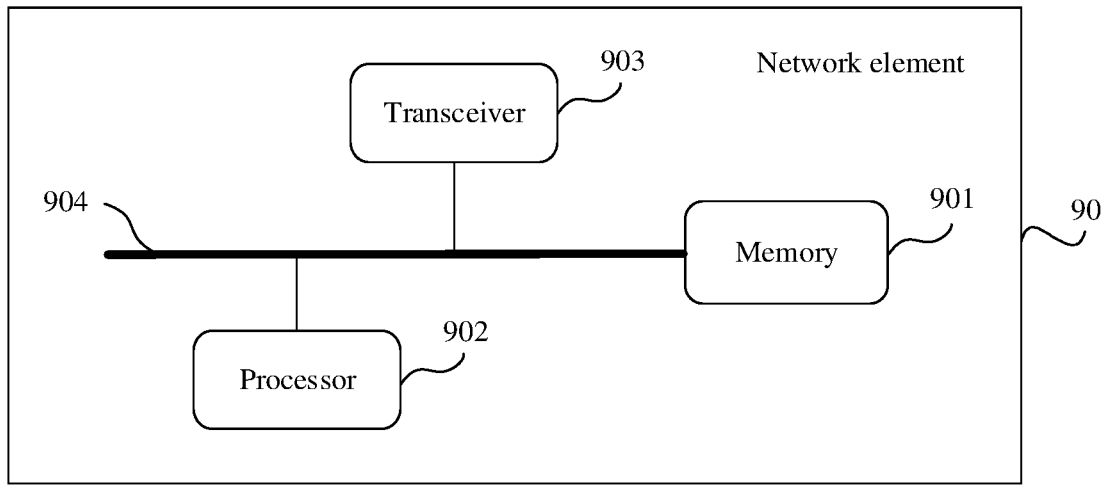
FIG. 9 is a schematic structural diagram of a second embodiment of a network element.

FIG. 9 is a schematic structural diagram of a second embodiment of a network element. As shown in FIG. 9, the network element 90 provided in this embodiment may include: a memory 901, a processor 902, a transceiver 903, and at least one communications bus 904.

The communications bus 904 is configured to implement a communication connection between elements. The memory 901 may include a high-speed RAM memory, or may include a non-volatile memory NVM, for example, at least one magnetic disk storage. The memory 901 may store various program instructions used to perform various processing functions and implement the method steps in the foregoing embodiments. The transceiver 903 may be a corresponding input/output interface with a communication function. The transceiver 903 is configured to receive a flow table message from a controller, where the flow table message includes buffer information of a data packet matching a flow table. The processor 902 is configured to invoke the program instructions in the memory 901 to perform the following step: processing a buffer of the data packet based on the buffer information. The transceiver 903 is further configured to send a flow table response message to the controller.

Optionally, the buffer information includes buffer creation instruction information, buffer modification instruction information, or buffer deletion instruction information.

Optionally, the buffer information includes buffer type information, and the buffer type information is used to indicate a saving manner of the data packet.

Optionally, the buffer type information includes: saving a received data packet, or saving and forwarding a received data packet.

Optionally, the buffer information includes a buffer creation trigger indication, and the buffer creation trigger indication is used to indicate a creation occasion of the buffer.

Optionally, the buffer creation trigger indication includes: an indication of creating the buffer when the network element receives the flow table message, or an indication of creating the buffer when a receiving rate of the network element is greater than a forwarding rate of the network element.

Optionally, the buffer information includes a size of a storage space of the buffer.

Optionally, the buffer information is located in an action set field of the flow table message.

The network element in this embodiment may be used to perform the technical solution in any of the first embodiment to the sixth embodiment of the buffer control method. Their implementation principles and technical effects are similar, and details are not described herein again.

Figure 10:
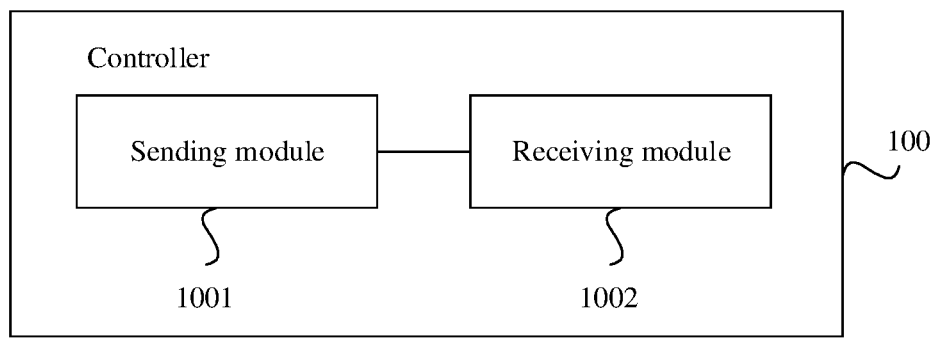
FIG. 10 is a schematic structural diagram of a first embodiment of a controller.

FIG. 10 is a schematic structural diagram of a first embodiment of a controller. As shown in FIG. 10, the controller 100 provided in this embodiment may include a sending module 1001 and a receiving module 1002.

The sending module 1001 is configured to send a flow table message to a network element, where the flow table message includes buffer information of a data packet matching a flow table.

The receiving module 1002 is configured to receive a flow table response message from the network element.

Optionally, the buffer information includes buffer creation instruction information, buffer modification instruction information, or buffer deletion instruction information.

Optionally, the buffer information includes buffer type information, and the buffer type information is used to indicate a saving manner of the data packet.

Optionally, the buffer type information includes: saving a received data packet, or saving and forwarding a received data packet.

Optionally, the buffer information includes a buffer creation trigger indication, and the buffer creation trigger indication is used to indicate a creation occasion of the buffer.

Optionally, the buffer creation trigger indication includes: an indication of creating the buffer when the network element receives the flow table message, or an indication of creating the buffer when a receiving rate of the network element is greater than a forwarding rate of the network element.

Optionally, the buffer information includes a size of a storage space of the buffer.

Optionally, the buffer information is located in an action set field of the flow table message.

The controller in this embodiment may be used to perform the technical solution in any of the first embodiment to the sixth embodiment of the buffer control method. Their implementation principles and technical effects are similar, and details are not described herein again.

Figure 11:
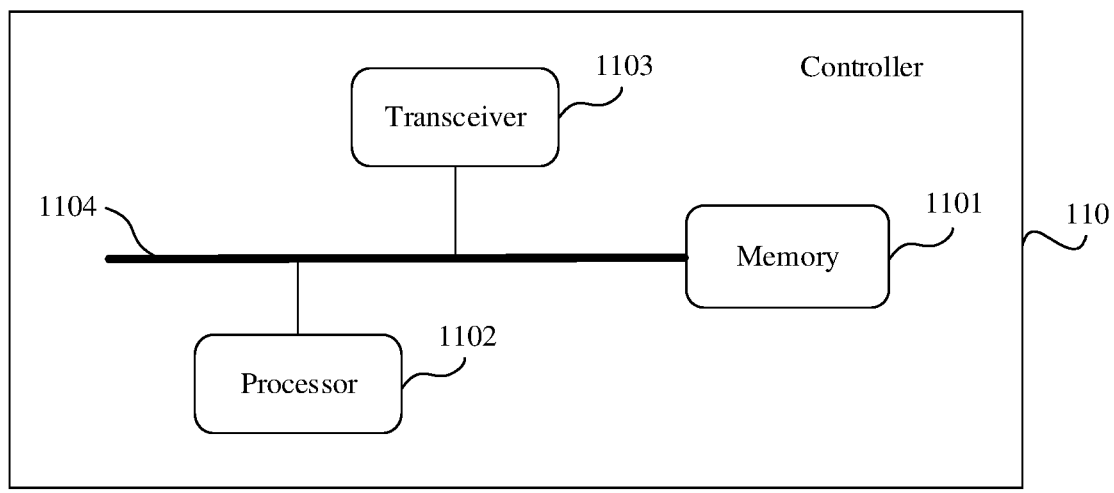
FIG. 11 is a schematic structural diagram of a second embodiment of a controller.

FIG. 11 is a schematic structural diagram of a second embodiment of a controller. As shown in FIG. 11, the controller 110 provided in this embodiment may include: a memory 1101, a processor 1102, a transceiver 1103, and at least one communications bus 1104.

The communications bus 1104 is configured to implement a communication connection between elements. The memory 1101 may include a high-speed random access memory (RAM), or may include a non-volatile memory (NVM), for example, at least one magnetic disk storage. The memory 1101 may store various program instructions used to perform various processing functions and implement the method steps in the foregoing embodiments. The processor 1102 is configured to invoke the program instructions in the memory 1101. The transceiver 1103 may be a corresponding input/output interface with a communication function. The transceiver 1103 is configured to send a flow table message to a network element, where the flow table message includes buffer information of a data packet matching a flow table. The transceiver 1103 is further configured to receive a flow table response message from the network element.

Optionally, the buffer information includes buffer creation instruction information, buffer modification instruction information, or buffer deletion instruction information.

Optionally, the buffer information includes buffer type information, and the buffer type information is used to indicate a saving manner of the data packet.

Optionally, the buffer type information includes: saving a received data packet, or saving and forwarding a received data packet.

Optionally, the buffer information includes a buffer creation trigger indication, and the buffer creation trigger indication is used to indicate a creation occasion of the buffer.

Optionally, the buffer creation trigger indication includes: an indication of creating the buffer when the network element receives the flow table message, or an indication of creating the buffer when a receiving rate of the network element is greater than a forwarding rate of the network element.

Optionally, the buffer information includes a size of a storage space of the buffer.

Optionally, the buffer information is located in an action set field of the flow table message.

The controller in this embodiment may be used to perform the technical solution in any of the first embodiment to the sixth embodiment of the buffer control method. Their implementation principles and technical effects are similar, and details are not described herein again.

It may be clearly understood by a person of ordinary skill in the art that, for the purpose of convenient and brief description, division of the foregoing function modules is used as an example for the purposes of this description. Thus, it is understood that the foregoing functions can be allocated to different function modules and implemented according to a requirement, that is, an inner structure of an apparatus is divided into different function modules to implement all or some of the functions described above. For a detailed working process of the foregoing apparatus, a corresponding process in the foregoing method embodiments may be referred to, and details are not described herein again.

In the several embodiments provided, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed in a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A buffer control method, comprising:
receiving, by a network element, a flow table message from a controller, wherein the flow table message comprises buffer information of a data packet matching a flow table;
processing, by the network element, a buffer of the data packet based on the buffer information; and
sending, by the network element, a flow table response message to the controller,
wherein the buffer information comprises buffer creation instruction information, buffer modification instruction information, and buffer deletion instruction information,
wherein the buffer information is located in an action set field of the flow table message,
wherein a buffer processing based on the flow table message is supported in OpenFlow protocol,
wherein the network element includes a plurality of network elements, at least one of the plurality of network elements sends to the controller a create flow table request, and the controller sends the flow table message in response to the create flow table request, and
wherein the create flow table request carries identifiers of a source network element and a target network element, and the flow table is created for a data flow between the source and target network element.

2. The method according to claim 1, wherein the buffer information comprises buffer type information, and the buffer type information is used to indicate a saving manner of the data packet.

3. The method according to claim 2, wherein the buffer type information comprises saving a received data packet and saving and forwarding a received data packet.

4. The method according to claim 3, wherein the buffer type information includes the saving and the forwarding of the received data packet, such that the buffer forwards the received data packet while the buffer is saving the received data packet.

5. The method according to claim 1, wherein the buffer information comprises a buffer creation trigger indication, and the buffer creation trigger indication is used to indicate a creation occasion of the buffer.

6. The method according to claim 5, wherein the buffer creation trigger indication comprises an indication of creating the buffer when the network element receives the flow table message, and an indication of creating the buffer when a receiving rate of the network element is greater than a forwarding rate of the network element.

7. The method according to claim 1, wherein the buffer information comprises a size of a storage space of the buffer.

8. The method according to claim 1, wherein:
the buffer creation instruction information is used to instruct the network element to create the buffer configured to store the data packet matching the flow table;
the buffer modification instruction information is used to instruct the network element to modify attribute information of the buffer corresponding to the flow table, the attribute information comprises a buffer type information of the buffer and a size of a storage space of the buffer; and
the buffer deletion instruction information is used to instruct the network element to delete the buffer corresponding to the flow table.

9. A buffer control apparatus, comprising:
at least one processor coupled with a memory, wherein the at least one processor is configured to execute instructions stored in the memory, to enable the apparatus to perform the following operations:
receiving a flow table message from a controller, wherein the flow table message comprises buffer information of a data packet matching a flow table;
processing a buffer of the data packet based on the buffer information; and
sending a flow table response message to the controller,
wherein the buffer information comprises buffer creation instruction information, buffer modification instruction information, and buffer deletion instruction information,
wherein the buffer information is located in an action set field of the flow table message,
wherein a buffer processing based on the flow table message is supported in OpenFlow protocol,
wherein the buffer control apparatus sends to the controller a create flow table request, and the controller sends the flow table message in response to the create flow table request, and
wherein the create flow table request carries identifiers of a source network element and a target network element, and the flow table is created for a data flow between the source and target network element.

10. The apparatus according to claim 9, wherein the buffer information comprises buffer type information, and the buffer type information is used to indicate a saving manner of the data packet.

11. The apparatus according to claim 10, wherein the buffer type information comprises saving a received data packet, and saving and forwarding a received data packet.

12. The apparatus according to claim 9, wherein the buffer information comprises a buffer creation trigger indication, and the buffer creation trigger indication is used to indicate a creation occasion of the buffer.

13. The apparatus according to claim 12, wherein the buffer creation trigger indication comprises an indication of creating the buffer when a network element receives the flow table message, and an indication of creating the buffer when a receiving rate of the network element is greater than a forwarding rate of the network element.

14. The apparatus according to claim 9, wherein the buffer information comprises a size of a storage space of the buffer.

15. A buffer control system, comprising:
a controller; and
a network element, configured to receive a flow table message from the controller, wherein the flow table message comprises buffer information of a data packet matching a flow table, process a buffer of the data packet based on the buffer information, and send a flow table response message to the controller, wherein the buffer information comprises buffer creation instruction information, buffer modification instruction information, and buffer deletion instruction information, wherein the buffer information is located in an action set field of the flow table message, wherein a buffer processing based on the flow table message is supported in OpenFlow protocol, wherein the network element includes a plurality of network elements, at least one of the plurality of network elements sends to the controller a create flow table request, and the controller sends the flow table message in response to the create flow table request, and wherein the create flow table request carries identifiers of a source network element and a target network element, and the flow table is created for a data flow between the source and target network element.

16. The system according to claim 15, wherein the buffer information comprises buffer type information, and the buffer type information is used to indicate a saving manner of the data packet.

17. The system according to claim 16, wherein the buffer type information comprises saving a received data packet, and saving and forwarding a received data packet.

* * * * *